US008442932B2

(12) United States Patent
Zangwill

(10) Patent No.: US 8,442,932 B2
(45) Date of Patent: *May 14, 2013

(54) SYSTEM AND METHOD FOR MAKING DECISIONS

(75) Inventor: Willard I. Zangwill, Chicago, IL (US)

(73) Assignee: Decision Command, Inc., Chicago, IL (US)

( * ) Notice: Subject to any disclaimer, the term of this patent is extended or adjusted under 35 U.S.C. 154(b) by 553 days.

This patent is subject to a terminal disclaimer.

(21) Appl. No.: 12/719,956

(22) Filed: Mar. 9, 2010

(65) Prior Publication Data

US 2011/0040720 A1    Feb. 17, 2011

Related U.S. Application Data

(63) Continuation-in-part of application No. 11/651,827, filed on Jan. 10, 2007, now Pat. No. 7,676,446.

(60) Provisional application No. 60/758,452, filed on Jan. 11, 2006, provisional application No. 60/758,453, filed on Jan. 11, 2006, provisional application No. 60/758,454, filed on Jan. 11, 2006.

(51) Int. Cl.
*G06F 9/44* (2006.01)
*G06N 7/02* (2006.01)
*G06N 7/06* (2006.01)

(52) U.S. Cl.
USPC ............................................. 706/52

(58) Field of Classification Search ............. 706/52
See application file for complete search history.

(56) References Cited

U.S. PATENT DOCUMENTS

| 5,774,121 | A | 6/1998 | Stiegler | |
| 6,338,713 | B1 | 1/2002 | Chamoun et al. | |
| 6,826,552 | B1 * | 11/2004 | Grosser et al. | 706/47 |
| 7,130,836 | B2 * | 10/2006 | Grosser et al. | 706/47 |
| 7,287,017 | B2 | 10/2007 | Pellinat | |
| 7,676,446 | B2 * | 3/2010 | Zangwill | 706/60 |
| 8,065,261 | B2 * | 11/2011 | Kellogg et al. | 706/62 |
| 2003/0101076 | A1 | 5/2003 | Zaleski | |
| 2005/0067493 | A1 | 3/2005 | Urken | |

* cited by examiner

*Primary Examiner* — Michael B Holmes
(74) *Attorney, Agent, or Firm* — Mayer & Williams PC; Mark D. Wieczorek

(57) ABSTRACT

Systems and methods are disclosed that assist in making decisions, valuing a choice or action, promoting creative solutions, and reducing risks. Among other situations, the systems and methods consider situations where the user or users are evaluating a possible single choice or several alternative choices. The criteria to evaluate the decisions are input into a grid, and the user or users rate the one or more alternatives against the different criteria. Given several alternative choices or options, the system and method provides the probability each alternative is the right selection. In one embodiment, the system implements a Bayesian approach. The systems and methods may estimate the value of an option or choice, where the value might be financial or other metric, and may estimate the value of a risk, opportunity or factor that might influence the result. The systems and methods may estimate the amount the chance of being surprised or missing some relevant consideration has been reduced by the analysis. The possibility of black or gray swans can also be estimated, in the phraseology of Nassim Taleb. Systems and methods so disclosed may be employed in financial analyzes, project or strategy selection, betting, resolution of disagreements, intelligence analysis, and so on.

11 Claims, 33 Drawing Sheets

The arrows depict possible anomalous reasoning, such as bias or hidden assumptions. The green shows that the criterion supports the alternative, the red that the alternative is against or contraindicates. The thickness of the arrows reflect the strength of the anomaly in terms of its impact or amount of deviation. .

Visual display of the pros and cons for a particular alternative. This information can be displayed for each alternative.

| Action Plan | | | | |
|---|---|---|---|---|
| Copy | | Action | Ownership | Monitoring/ Performance Measures |
| Positive Factors (Top five) | | | | |
| Customization | H | 2.74 | | |
| Suitability to Traffic | | 2.56 Integrate traffic immediately | Betsy | |
| Efficiency/Productivity | | 2.10 | | |
| Overall Flexibility | | 2.05 | | |
| Ease of installation | | 2.05 | | |
| Negative Factors: WARNING | | | | |
| Cost | H | -2.43 Set up Cost control war room | Jesse | Check accuracy of costs week |
| Suitability to Sales | | -2.07 Involve sales immediately | VP sales | Monitor list of sale's concerns |
| Suitability to Accounting | | -1.99 Involve accounting immediately | CFO | Monitor list of accounting conce |
| Compatibility with other systems | | -1.96 | | |

*FIG. 12*

|  | 3rd Wave Atlanta | VALUE | Cubanos | VALUE | NET VALUE COMPARISON |
|---|---|---|---|---|---|
|  |  | 1300 |  | 1150 | 150 |
| Cost | H | --- | -100 | ~ | 100 |
| Web capabilities |  | + | 400 | N | 200 |
| Suitability to Finance |  | + | 400 | N | 50 |
| Overall Flexibility |  | N | 200 | + | 300 |
| Suitability to Traffic |  | + | 400 | ++ | 500 |

*FIG. 15*

| | 3rd Wave-Atlanta | VALUE | Cal-new | VALUE | NET VALUE COMPARISON |
|---|---|---|---|---|---|
| | | 1300 | | 1150 | 150 |
| Cost | H | | – | 100 | |
| Web capabilities | + | 400 | N | 200 | |
| Suitability to Finance | + | 400 | N | 50 | |
| Overall Flexibility | N | 200 | + | 300 | |
| Suitability to Traffic | + | 400 | ++ | 500 | |

*FIG. 16*

| Substantial decrease. | Some impairment | Typical, average, same as past | Good -improvement, | Substantial improvement |
|---|---|---|---|---|
| High turnover. Lack of good ideas in pipeline. Little insight into product failures. Conflicting directions. Competitors very aggressive in innovation. | Loss of critical personnel. No improved methodology. Static budget. Inadequate cooperation m of R&D with other departments Competitors provide strong brand experience. | Continued budgeting and similar quality of work as was done in past. | Boost in budgeting. Key employees retained Emotional attachment with customer stressed.. Front line employees trained, Segment market in terms of value. Competitors weak in these areas. | Significant boost in budget. Emotional attachment stressed and tested in all interactions with customer. Front line employees trained, tested, monitored Segment market in terms of value, tested. Customer feedback on attachment to firm. Competitors much weaker. Significant boost in methodology, information. |

FIG. 20

| Evidence | Weight | Disagreement | Proposition | Proposition | Proposition | Proposition |
|---|---|---|---|---|---|---|
| Market Share | H | 1.30 | | | | |
| VPMarketing | H | | + | N | N | N |
| VPEngineering | H | | + | N | + | N |
| BusinessDirector | H | | N | N | + | N |
| ProjectTeam | H | | + | + | ++ | N |
| Entertainment | H | 2.00 | | | | |
| VPMarketing | H | | − | N | N | N |
| VPEngineering | H | | + | N | N | N |
| BusinessDirector | H | | N | N | N | N |
| ProjectTeam | H | | N | N | N | N |
| Low Impact | H | 2.50 | | | | |
| VPMarketing | H | | + | N | N | N |
| VPEngineering | H | | + | N | N | N |
| BusinessDirector | H | | N | N | N | N |
| ProjectTeam | H | | N | N | + | N |
| Brand Building | H | 2.15 | | | | |
| VPMarketing | H | | + | + | N | N |
| VPEngineering | H | | N | N | N | N |
| BusinessDirector | H | | N | N | N | N |
| ProjectTeam | H | | N | N | N | N |
| Barriers to Entry | H | 1.80 | | | | |
| VPMarketing | H | | N | N | + | N |
| VPEngineering | H | | + | ++ | ++ | + |
| BusinessDirector | H | | N | + | N | N |

FIG. 23

ROLE (simulated)--indicate motivations and concerns

Terrorist leader. Want attack large group, mayhem, surprise, easy target. Not to assassinate some particular person 1. GOAL--what is overall goal, purpose Disrupt U.S efforts in Iraq by hitting Iraqi training center or US convoy 2. ALTERNATIVES --The different alternatives or options for achieving the goal (read only)

Attack on Training center for Iraqi police/army
Attack on US troop convoy

3. FACTS AND FACTORS---Criteria for selecting the best alternative (read only)

ABILITY TO INFLICT DAMAGE, HARM
Ability to harm Iraqi govt
Ability to harm infrastructure
Ability to harm US personnel
Abillity to harm other foreign personnel
Number of civilians in area who could be harmed.

[ Ok ]  [ Cancel ]

*FIG. 25*

| | Attack on Training center in Iraqi police army | Attack on US troop convoy |
|---|---|---|
| Role: Terrorist leader. Want attack large group, mayhem, surprise, easy target. Not assassinate some particular person.<br>Goal: Disrupt U.S efforts in Iraq by hitting Ir training center or US convoy | | |
| Factors　　　　　　　　　　Alternatives<br>　　　　　　　　　　　Weight ↓ | | |
| ABILITY TO INFLICT DAMAGE, HARM | | |
| Ability to harm Iraqi govt　　　　　M | | |
| Ability to harm infrastructure | | |
| Ability to harm US personnel　　　　H | | |
| Ability to harm other foreign personnel | | |
| Number of civilians in area who could be harmed　　H | | |
| EASE OF ACCESS | | |
| Ease of access by vehicle　　　　H | | |
| Security of site | | |
| SUPPORT, INCITEMENT | | |
| Support from local populace | | |
| Publicity possible on Arab TV due to attack | | |
| Level of incitement in mosques sermons in area | | |

*FIG. 26*

GENERATE NEW IDEAS AND INSIGHTS. DONE AFTER THE BASIC MATRIX IS COMPLETED.

USEFUL TO
1. REDUCE THE PROBABILITY OF ALTERNATIVE X, THE CHANCE OF MISSING SOMETHING IMPORTANT OR BEING SURPRISED.
2. RESOLVE AGREEMENTS CREATIVELY
3. DISCOVER NEW OPPORTUNITIES, BOOST REWARDS, REDUCE RISK

THE INVENTION WILL AUTOMATICALLY POPULATE THE CORNERS OF THE DIAGRAM WITH FOUR OF THE MOST IMPORTANT FACTORS. (THESE CAN BE CHANGED, IF DESIRED)

THE USER BUILDS ON THE FOUR CORNER FACTORS BY INPUTTING THOUGHTS TO THE INTERNAL BLOCKS. ANY IDEA GENERATED IS USEFUL TO FILL UP THE BLOCKS.

SOON NEW INSIGHTS USUALLY OCCUR BECAUSE THE NEW IDEAS ARE BEING DEVELOPED FROM THE MOST IMPORTANT FACTORS OR CRITERIA.

*FIG. 30*

SYSTEM AND METHOD FOR MAKING DECISIONS

CROSS-REFERENCE TO RELATED APPLICATIONS

This application is a continuation-in-part patent application of U.S. patent application Ser. No. 11/651,827, filed Jan. 10, 2007, entitled "System and Method for Making Decisions", now U.S. Pat. No. 7,676,446, which claims the benefit of the following US Provisional Patent Applications: U.S. Provisional Patent Application Ser. No. 60/758,452, filed Jan. 11, 2006, entitled "Method For Determining Bias, Assumptions Or Atypical Reasoning In Decision Making"; U.S. Provisional Patent Application Ser. No. 60/758,453, filed Jan. 11, 2006, entitled "Method For Use When Making A Decision That Estimates The Chance That The Individual Can Do A Better Job Because He Or She Has Missed Something Important"; and U.S. Provisional Patent Application Ser. No. 60/758,454, filed Jan. 11, 2006, entitled "Method To Visually Display The Pros and Cons of Alternative Decision Choices"; each of which is incorporated by reference herein in its entirety.

FIELD OF THE INVENTION

The invention relates to decision making and analysis of one or more alternative choices, options or possibilities, and in particular decision making and analysis in complex situations with conflicting information, information that might be incomplete or somewhat erroneous and where individuals might different in their viewpoints.

BACKGROUND OF THE INVENTION

As has been well-researched in various behavioral sciences and is repeatedly observed in real life, in complex situations selecting the correct action or decision is difficult and impacted by many factors. Surprises might occur as well as risks, both seen and unseen, including black or gray swans.

These deficiencies can cause dangerous problems. Surprise is a perennial problem in intelligence analysis, as well as in any complex prediction. Similarly is the problem of missing pertinent risks or opportunities.

In another field, consider estimating the value of an option or possible choice, such as financial value, sales potential, quality, level of response by opposing interests, and so on. Such valuations are fraught with risks, not to mention differing opinions that must be perceptively sorted out and resolved.

In almost any decision or analysis, creativity and insight is critical to success, and means to promote that and a sophisticated understanding of the situation are often assisted by special techniques.

A variety of decision support tools have been developed to help users make better decisions in risky and uncertain situations, including: optimization programs, statistical analyses, simulations, and an array of data mining and artificial analysis techniques. The current inventor's co-pending parent application U.S. patent application Ser. No. 11/651,827, filed Jan. 10, 2007 entitled "System and Method for Making Decisions" is another example of such a decision support tool.

SUMMARY OF THE INVENTION

In one aspect, the invention is directed to a method of decision-making, including: entering at least two alternative options into a database; for each of the alternative options, entering at least one criterion or weighting for evaluating the options; specifying the relative importance of each of the criteria or weightings; specifying, for each criteria and option, a strength rating, wherein the specifying a strength rating indicates how well the criteria or weighting either supports the option or is opposed or contrary to the option; and calculating a result for each alternative option based on the importance and strength ratings.

Implementations of the invention may include one or more of the following. The result may be selected from the group consisting of: the best choice of the options, the option most likely to occur, or a ranking of the impact of the different options. The two alternative options may be to take an action and to not take the action. The importance weightings and strength ratings may be entered using a format selected from the group consisting of: a tabular format, a grid format, matrix, cross-reference format, a spreadsheet, a database, another program and combinations of the above. The calculating may be performed using an analysis method selected from the group consisting of: a Bayesian analysis, a neural network analysis, an artificial intelligence analysis, simulations, other probabilistic algorithms, heuristics, human judgment or combinations of the above. The method may further include the step of analyzing the importance or strength ratings in combination with the alternative to determine a consistency level for the alternative-criterion pair, whereby ratings may be identified that have a relatively high chance of being due to bias, hidden assumptions, suspect origins, preconceptions, unusual reasoning or creative insights. The method may further include the step of analyzing the importance or strength ratings and identifying if any of said ratings are anomalous, where anomalous ratings may be those that are unusually higher or lower than others in its criterion. The method may further include the step of analyzing the importance or strength ratings and identifying if any of said ratings bear an unusually large or small impact on the result.

Implementations of the invention may also include one or more of the following. The method may further include the step of displaying the anomalies in a graphical or visual manner, wherein the displaying may be selected from the group consisting of: displaying a matrix including information corresponding to an anomalous criterion and alternative; displaying a diagram in which arrows, lines, or other connections reveal which criterion correspond to which alternatives. The method may further include the step of estimating the chance that a correct alternative was missed, that an unknown issue was not considered, or that a surprise or surprising event might occur. If the chance that a correct alternative was missed or that an unknown alternative was not considered exceeds a predetermined threshold, the method may further include the step of displaying a notification to the user about the exceeded threshold. The notification may indicate that additional data should be entered. The method may further include the step of positing a new alternative and positing properties about the new alternative. The new alternative may be provided with default properties, or with average or neutral properties. The calculating step may employ a methodology selected from the group consisting of: Bayesian methodology, the LaPlace plus one method, and the Good-Turing methodology. The method may further comprise estimating probabilities of at least one unknown-unknown or one known-unknown.

Implementations of the invention may also include one or more of the following. The method may further include the step of displaying the results of the calculations in a graphical user interface that also includes representations of at least the alternatives and the criteria. The method may further include the step of displaying the results of the calculations in a graphical user interface that also includes representations of at least the ratings and any unknown-unknowns or known-unknowns. The graphical user interface can have at least ratings, alternatives, or criteria modified by the user and the consequent results automatically displayed on the graphical user interface. If the chance that a correct alternative was missed or that an unknown-unknown alternative or known-unknown alternative was not considered exceeds a predetermined threshold, the method may further include the step of displaying a notification to the user about the exceeded threshold on the graphical user interface. The notification may indicate that additional data should be entered. At least one of the importance ratings and strength ratings may be entered as a non-numerical value, and further comprising converting the rating from a non-numerical value to a numerical value. At least one of the importance ratings and strength ratings may be entered as a numerical value, and further comprising re-scaling the rating from a numerical value to a probability.

Implementations of the invention may also include one or more of the following. The method may further comprise displaying pros and cons of each alternative, wherein the pros are criteria that support the alternative, and the cons are criteria that contraindicate the alternative. The pros and cons may be displayed with bar charts, and the length of a bar may be related to the strength of the criteria. The pros and cons may be displayed in such a way as to also display the degree to which the criteria distinguishes which alternative is best. The method may further include the step of identifying risks. The identifying step may include determining a set of most critical strengths and weaknesses for a given alternative. Actions designed to reduce, eliminate or mitigate the risks of any alternative may be designed and implemented. A level of error in an output result may be less than a level of error in input data. The method may further include prompting the generation of new or additional ideas, insights and perceptions by employing information relevant to the situation and/or information developed from the criteria and alternatives. The method may further include identifying critical criteria and factors that might serve to help generate pertinent new ideas and insights.

Implementations of the invention may also include one or more of the following. The method may further include permitting improved insight or forecasting of the actions, thoughts or beliefs of other parties by role-playing or simulating that the user is that other person. The method may further include prompting the input of the concerns, motivations and goals of other parties as well as the factors, considerations and alternatives those other parties might employ in making a decision or taking an action. The method may further include permitting several people to participate in making the decision or arriving at a conclusion. The method may further include creating a common framework or presentation of the different views of the several participants in a manner that facilitates discussion, promotes better understanding, helps resolve differences of opinion or prompts better decisions and results. The method may further include organizing the inputs of the participants by level of disagreement and displaying the criteria on the basis of the level of disagreement. The method may further include determining or predicting the value of a numerical variable. The method may further include estimating a range for the numerical variable, dividing that range into intervals, and then employing criteria and ratings to estimate the value of the variable.

Implementations of the invention may also include one or more of the following. The method may further include employing templates or guidelines to facilitate the entry of data where the templates or guidelines may be based upon human experience or the analysis of past information, and templates or guidelines may provide criteria to determine which rating value to employ. The method may further include identifying criteria and factors more likely to be predictive of future events as well as factors that do not predict. The method may further include examining, for a given alternative, which criteria expressly supported that alternative and which did not and, if the alternative is what actually later occurred, deeming the criteria that were supportive as possibly predictive while deeming the criteria that did not support the correct alternative not predictive, wherein criteria that consistently predict the right alternative are then identified as predictive. The method may further include forecasting the actions of at least one third party. The method may further include providing a entry form for new ideas and insights. A plurality of users may provide input about alternative options or criteria, and the method may further include collaboratively identifying at least one area of disagreement. The method may further include determining a numerical value related to an option. The method may further include identifying a risk associated with at least one option. The method may further include providing a form where an action may be entered, the action acting to mitigate or to reduce the risk.

In another aspect, the invention is directed to a computer program, residing on a computer readable medium, for carrying out the instructions of the above steps.

Advantages of the invention may include one or more of the following, depending on embodiment.

Embodiments of the invention may provide guidance to determine which of several alternative options or possibilities is the best or most likely or to rank the different alternatives. The ranking or selection would be done on the basis of certain criteria, such as facts, factors or considerations that would be believed to determine or influence which of the alternative possibilities is the best.

Embodiments of the invention may also include means of providing guidance to determine when to stop one's work in terms of making the decisions. That is, means are provided to determine if the analysis meets the needs of the decision, or whether one should continue research in the hope of arriving at a superior decision, action or analysis.

Systems are disclosed that provide means to estimate the level of unknown events in a situation, that is, events or considerations that might have been missed or unforeseen. The unknown events might include surprises or unanticipated risks, or unknown events that could be harmful or damaging or be blindsiding. Estimating the level of unknown events also facilitates the identification of those unknown events or the issues that were missed.

In this sense, the unknown events may be further divided into known-unknowns and unknown-unknowns. The known-unknowns are the issues known to be unknown. The unknown-unknowns comprise issues for which one is not even aware that they are unknown. Systems according to certain embodiments include means to estimate their likelihood and knowledge.

In many cases, it is necessary to forecast or predict what event is most likely to occur. Experience has shown that many of the criteria or factors people employ to reach a conclusion often have little predictive value and are largely irrelevant. By sorting the data that predicted from the data that did not, certain systems and methods disclosed have the advantage of helping to identify the predictive factors.

Moreover, each different alternative choice has its pros and cons, the considerations in favor of it and the considerations against it. The ones against often reflect risks, and the techniques disclosed may uncover these.

Many decisions are improved by the generation of new ideas or insights. The invention provides a system for creating new ideas that are directly pertinent to the specific issues involved in the decision. New ideas and insight can assist in many situations including: discerning issues or considerations that might have been missed or overlooked, such as a surprise; developing creative ways to overcome disagreements or disputes; and suggesting new opportunities or breaking deadlocks.

Decision making when several individuals are involved adds a level of complexity including the possibility of disagreements, disputes, and emotional reactions. Embodiments of the invention may provide means to achieve a more objective decision that better incorporates the inputs of the individuals and that might elevate commitment or agreement with the decision.

Certain decisions involve the actions of outsiders or those who might be in opposition, such as competitors, customers or the actions of enemies. The actions of such other parties are notoriously difficult to predict since they often have different goals and motivations. Certain embodiments of the invention may permit one to role play the other party and to gain greater insight into the other party's possible thinking or actions.

In some embodiments, the invention may provide means to automatically analyze the data input and identify possible biases or hidden assumptions. More, the same may provide means to make entry of the data easy such as the use of templates, pull down menus or copy-and-paste procedures. Different criteria may also be used, each with its own scale, and yet still obtain the same result. The disclosed systems may also provide means to display the pro and cons, such as strengths and weaknesses, advantages versus risks, of each alternative, and incorporate into the pro and con ratings not just the degree of support of the factor but also the factor's ability to discriminate among the different alternatives.

After a decision is made, additional steps might be taken. Often other individuals might have to be convinced of the decision's validity. Embodiments of the invention include systems that present the rationale for the decision clearly and concisely and in color.

Even if the best decision is made, few decisions are without risks. For the decision made, the invention possesses systems that help to identify the risks of that decision and to mitigate and counter those risks.

Other advantages of the invention will be apparent from the description below, including the figures and claims.

BRIEF DESCRIPTION OF THE DRAWINGS

FIG. 12 depicts a graphical representation of risks, including strengths and weaknesses for each risk.

FIG. 15 shows the representation of FIG. 14 including a financial comparison.

FIG. 16 shows the representation of FIG. 14 including a detect deviations function.

FIG. 20 is a guideline for an exemplary embodiment.

FIG. 23 illustrates an example when several people are involved in a decision.

FIGS. 25 and 26 illustrate exemplary methods according to the invention to gain insights by simulating an opponent's way of thinking.

FIG. 30 illustrates a method corresponding to the examples such as shown in FIGS. 28 and 29.

DETAILED DESCRIPTION

Figure 1:
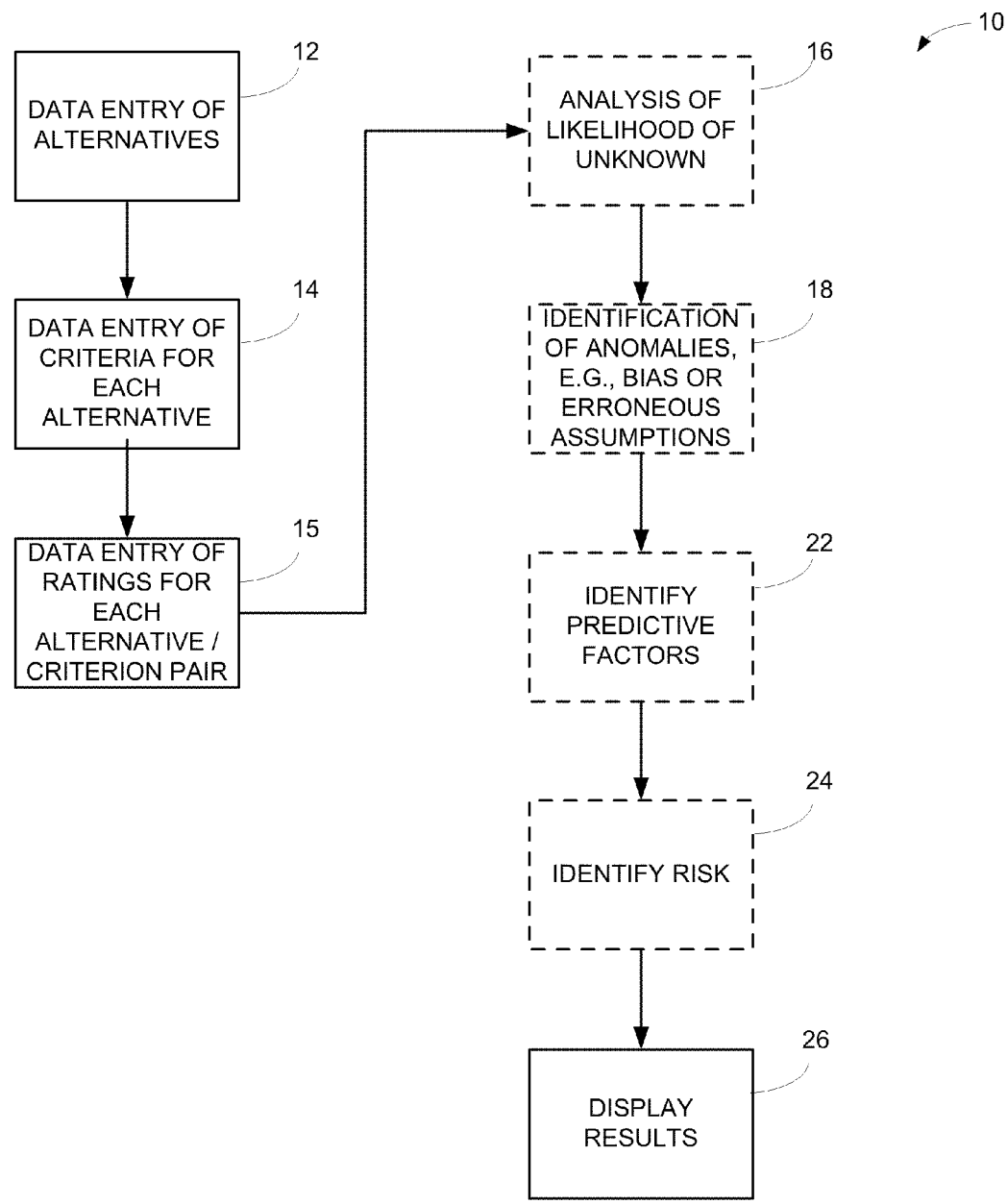
FIG. 1 is a flowchart showing a method according to a first embodiment of the invention.

Referring to FIG. 1, a method according to a first embodiment of the invention is shown. In this method 10, a first step is the data entry of alternatives (step 12). In other words, the user enters the various alternatives to be decided among into the database. The different alternatives may be choices, options, possibilities, potentialities, hypotheses, events, etc. As an example, the alternatives might be different locations that an enemy may attack, which strategy to select, a set of companies into which a venture capitalist may invest, etc. In this application, these choices are denoted by capital letters, such as systems A, B, C, and so on. Sources for data may include the user, a partially-filled-in template, a copy-and-paste procedure from another program such as Access or Excel or the like, or via automatic entry from other programs.

$p_A$ denotes the probability alternative A is the correct choice, $p_B$ denotes the probability that alternative B is the right choice and similarly for $p_C$.

Since the probabilities must sum to 1 the following equation holds.

$$p_A + p_B + p_C = 1 \qquad (1)$$

It is noted in this context that three choices are employed for clarity, however, an almost unlimited number of alternatives may be contemplated.

The question desired to be answered by the user may pertain to, e.g., which is the best choice among A, B, and C, or which is most likely to occur, or a ranking of the impact of the different possibilities, etc.

The next step is for the user to enter certain criteria to be employed in the calculations (step 14). Criteria generally constitute the major facts, factors, and considerations of the situation. For example, for selecting the best product, the criteria may be price, quality, performance, flexibility, ability to customize, etc.

Of course, while user determination of criteria is noted here, the criteria may be determined automatically as well by, e.g., templates, various data mining techniques, etc.

The next step is to rate the criteria for their importance on some numerical or other scale (first part of step 15). For example, if the price factor is important, it might receive a weight of High to reflect that it is a highly important consideration in the decision. The weighting might be input numerically or, in the preferred representation by symbol: Low, Medium or High. The system may then transform any symbolic entry into a numerical value via a user-generated or default table. The criteria may have other data associated with the same such as importance, date of origination, priority, and so on, and these may be used to, e.g., adjust the numerical value of the symbolic entry. For example, criteria based on more recent data may be given more weight than older data. For each criterion and its corresponding scale, the same may be re-scaled to a measure of probability, in which case the numerical values for each alternative-criterion pair may then be interpreted as a probability.

The user then rates or evaluates the different alternatives against these criteria and the resulting data is entered into the program (second part of step 15). In particular, the user provides specific ratings of how each alternative was rated or evaluated on the different criteria. The ratings might be numerical, say on a scale of 1 to 10. Or the ratings might be in symbols (or letters), as these are often more convenient to enter, especially in a drop-down menu. In this case, the system may transform the symbolic representation into an equivalent value. In one embodiment, the symbols range from −−, −, N, +, ++ (double minus, minus, neutral or not relevant, plus, double plus). A rating of double minus means the alternative performs poorly on that criterion. For instance, if alternative A has very low reliability, it might receive a double minus on the reliability criterion. If alternative B has excellent flexibility, it might receive a double plus on the criterion of flexibility. If desired, the system may be designed to translate any symbolic rating into a numerical rating.

In one embodiment, a rating of N for Neutral or "Not relevant" receives a value of 0.5. This reflects being 50-50 either way, not supportive and not against, not good and not bad, not in favor and not against. The analogy is to flipping a perfectly weighted coin, where there is nothing to lead one to believe one way or the other.

If the rating happens to be a plus, it will receive a numerical value closer to 1, indicating that it is supportive or in favor. A negative rating will be less than 0.5 and closer to zero, indicating that is it more against, not supportive or not in favor of the alternative. Clearly, the closer the rating is to 1, the more positive or in favor of the alternative. The closer it is to zero, the more negative or against it is, the less supportive or less in favor.

The ratings may be done individually, that is, separately for each alternative and each criterion, or using several together, or as part of a formal approach such as a Bayesian Network, a decision tree, a simulation, a statistical analysis, or the like.

As with the weightings, the table of transformation of the symbols into numerical values can be input by the user or a default table pre-specified and employed.

As examples, if the user rates system A high on reliability, this will increase $p_A$, the likelihood system A is the right choice. If system B rates low on customization, that will lower $p_B$, the probability B is the best choice. If the user rates system A higher than system B on the important criteria, system A will obtain a higher probability of being the right selection.

To illustrate further, a decision may be sought about whether to develop product A or product B, and thus there are two alternatives, develop A or develop B. Several criteria may be used to select between A or B, specifically: development cost, whether a customer may be likely to purchase the product, how competitors might respond, and the ability to produce the product at high quality.

The alternatives would then be rated on each of the criteria. For example, if product A has a high development cost, then the numerical value for that rating would be low indicating that the high development cost is unfavorable to the development of product A. If product B has a low development cost, then the numerical rating for that would be high, since low development cost is favorable to B.

In this manner, each of the alternatives would be rated on each of the criteria. The user needs to select criteria so that if an alternative gets a high rating on most of them, it is likely to be the right choice. In particular, the user rates each alternative-criterion pair on how consistent they are. In other words, the user may consider if the alternative were the right choice, whether the criterion would be likely to be seen or occur.

Figure 2:
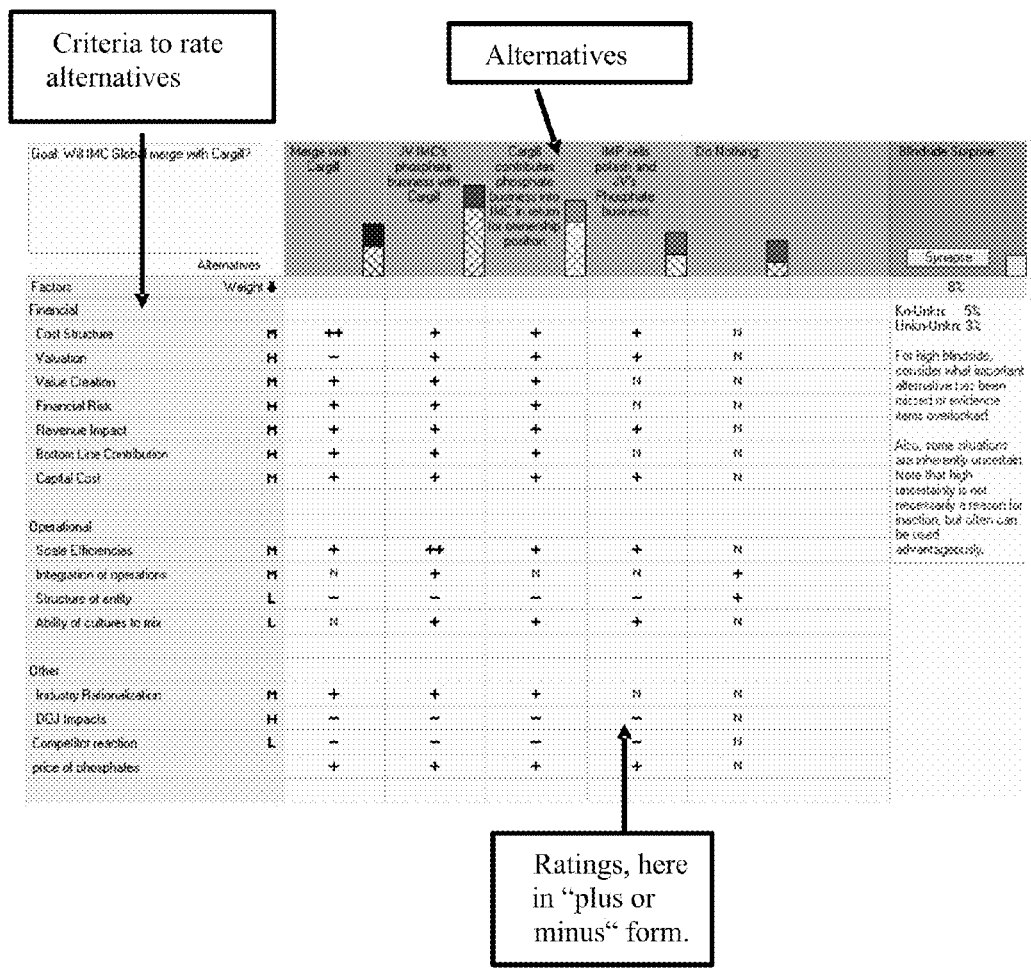
FIG. 2 shows a sample data entry grid.

This rating may be done in a matrix, grid or tabular form. In one exemplary embodiment, the alternatives may be given in columns and the criteria may be given in the rows. The cells in the grid may have the ratings for each alternative-criterion pair. Weightings for the importance of the criterion might also be employed. FIG. 2 illustrates an exemplary input table, where the rating entries are pluses or minuses, and those symbols are then transformed into numbers, after adjustment by any weighting.

At the end of the data entry phase, then, the following will have been entered into the grid: the various alternatives, the criteria used to rate the alternatives and the ratings themselves, adjusted for the criterion's weighting, where any non-numerical rating will have been transformed into numbers.

Entries may optionally be checked and new insights obtained by sorting the criteria in various ways, including on: diagnosticity, weight, importance, priority, date, or other related measures as described above. The entries may then be adjusted if necessary or desired.

Figure 11:
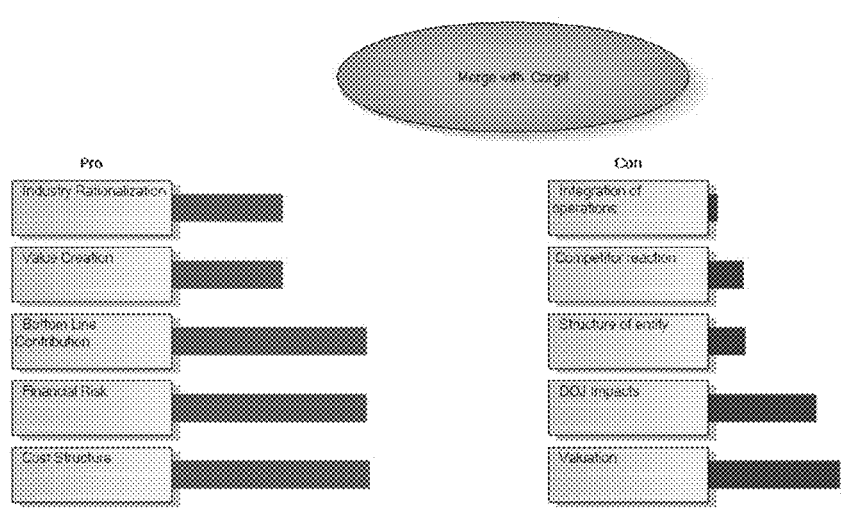
FIG. 11 shows an exemplary visual display of the pros and cons for a particular alternative.

Referring to FIG. 11, the system and method may be further employed to provide a visual or graphic display of the pros and cons of each of several different alternative possibilities or decision options. The pros are the evidence items or criteria that support the alternative, such as the alternative's advantages. These are illustrated by the green bars. The cons are the evidence items or criteria that are against or contraindicate the alternative, such as the risks or problems with the alternative, and are depicted with red bars. The longer the bar the stronger the factor is in the direction indicted. Longer green bars mean more strongly supportive. Longer red bars mean more strongly against.

Moreover, the pros and cons may be displayed in such a way as to reflect not just whether the factor is for the alternative or against the alternative, but rather may also incorporate the degree the factor distinguishes which alternative is best. For example, for a certain factor, e.g., cost, all of the alternatives may rate highly. Then the factor of cost supports all of the alternatives. But it does not help discriminate which is best. Cost is then a weak discriminator.

At this point, and referring back to FIG. 1, a number of optional alternative steps may be commenced. Each optional alternative may be undertaken on its own, or any combination of optional alternative steps may be undertaken, and in any order.

First, an estimate may be made of the likelihood of an unknown alternative occurring, such as the possibility of being surprised or "blindsided" (step 16). To help prevent surprises, certain embodiments of the invention may estimate the probability of one occurring. For a given decision, it might calculate that there is, say, an 18% chance something important was overlooked. In this way, the system alerts the user that something likely has been missed with roughly that probability.

Figure 3:
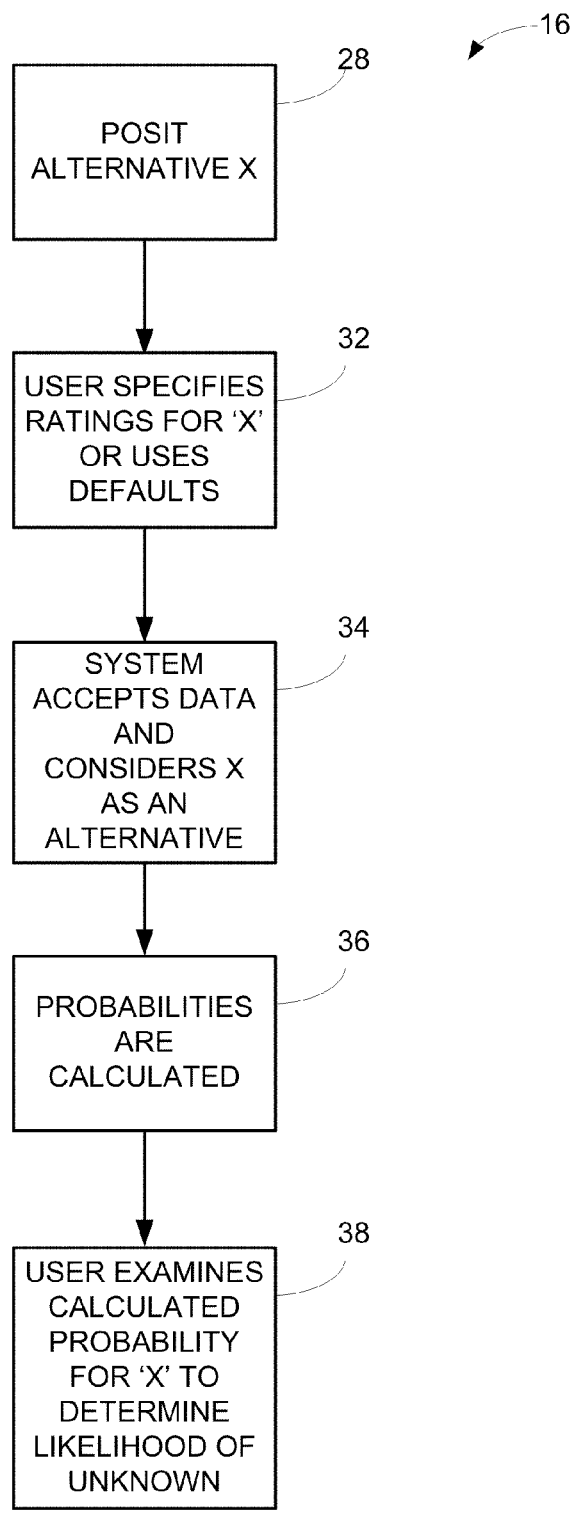
FIG. 3 is a flowchart showing a method of determining the likelihood that an unknown alternative has been missed.

Step 16 is now considered in more detail. Referring to FIG. 3, the systems and methods accomplish this by postulating (step 28) that there is an unknown alternative or consideration, e.g., Alternative X. Alternative X is an additional alternative or consideration and represents surprise, what is still unknown or overlooked.

The user then specifies ratings (step 32) for the criteria for Alternative X in the same way as above for the known alternatives, or uses default values if such ratings are unknown, e.g., from a template, database, via data mining, etc. The system accepts the additional unknown alternative and considers X as an alternative (step 34). Probabilities are calculated (step 36), and the user may then examine the calculated probabilities to determine the likelihood that this unknown may occur (step 38).

In more detail, there is the original group of n possible options and to that group the system adds another possibility termed Alternative X to create a set of n+1 options. If $p_X$ depicts the probability Alternative X is the correct choice, then a new equation (2) replaces equation (1), an equation that expressly includes the possibility of Alternative X.

$$p_A + p_B + p_C + p_X = 1 \quad (2)$$

Equation (2) allows the estimation of the probability of Alternative X even if nothing is known about it. Although a Bayesian procedure is used, any drop in the sum $(p_A + p_B + p_C)$ forces $p_X$ to increase. For instance, if the probability for Alternative A drops, while the probabilities for B and C remain the same, then the probability for Alternative X must rise. This constitutes one embodiment of a methodology for obtaining the probability for some unknown alternative.

As an example, the question may be as to whether to go to any one of three restaurants. Some information is received that is critical of one of them. That increases the chance of going to any of the other two, as well as to some restaurant not yet considered, Restaurant X.

As another example, it may be initially believed that A, B or C is sure to occur, meaning that the sum $p_A + p_B + p_C$ starts out equaling 1. But inconsistencies may be discovered in the information that drop that sum to 0.6. By equation (2), $p_X = 0.4$. This reveals that an unknown and possibly surprising event has a 40% chance of occurring.

In other words, even if almost nothing is known about X, knowledge of A, B and C provides information about X. As the probabilities for the original options are adjusted, the probability of Alternative X is adjusted.

Knowing the probability of Alternative X alerts the user to the seriousness of the possibility something might have been overlooked. If the probability of Alternative X reaches 10% or above, that is a clear warning alert in many situations. In other words, there is a relatively high probability of being surprised or blindsided. The systems and methods, in some embodiments, may also assist in discovering what has been missed, as is disclosed below.

As a corollary to this step, the embodiment also helps to determine when to stop working on a project or problem. In particular, stopping prematurely may result in some important consideration being overlooked. On the other hand, it is undesirable to continue working on a project or problem when additional effort is unlikely to improve the quality of the decision. In this embodiment, the system and method provide a signal about how much risk inures if efforts are ceased and no further examination is considered for the decision. Put another way, this method estimates the probability that something important has been missed. What was missed might be dangerous or harmful, e.g., that one will be blindsided or surprised. On the other hand, what was missed might have been a good opportunity.

As an example, consider the selection of a strategy to improve sales of a product, with the following alternatives: increase advertising, decrease price, or hold a special sale. The criteria may be: the expected number of new customers created, the cost of taking the action, the resources required in terms of having the people available for the project, the impact on profits, how quickly results can be obtained, and the possibility that action might influence the sales of other products that are being sold.

The user would rate each alternative on each of the criteria. For instance, the user would rate the alternative "increase advertising" on the criteria of "expected number of customers created", the "cost of taking the action" and so on. As discussed above, the ratings may be done on a scale such as bad to good, weak to strong, 1-100, using probabilities, etc.

Based upon those ratings, the procedure then provides the probabilities that each of the different alternatives is the best choice. For example, "increase advertising" may receive a probability of 65% of it being the best choice, "decrease price" may receive 20%, and "hold a sale" 15%.

This embodiment may assume the user already has a systematic procedure that accomplished these activities and provided these probabilities. That procedure may be capable of accepting different alternatives, and permitting the alternatives to be rated on different criteria.

The embodiment now estimates the chance that the right alternative was not even considered. It does so by postulating another alternative, such as Alternative X above, with the property that nothing is known about it, a priori. Since nothing is known about it, the best guess as to its features and qualities may be that it is average. That is, because statistically and in most circumstances, if one item is selected out of a population, the best guess about what will be selected is that its features or qualities will be average or neutral. Thus, Alternative X is assumed to be neither good nor bad on any of the criteria, just average or neutral.

The embodiment then adds "Alternative X" to the other alternatives so the list becomes: increase advertising, decrease price, hold a special sale, and Alternative X.

The procedure now recalculates the probabilities that each of the alternatives is the right choice, and yields new probabilities for all of the alternatives, including Alternative X.

In effect, the procedure reevaluates the probabilities but now with a new possibility, Alternative X. In many cases, the previously considered alternatives do well on some criteria and poorly on others. How Alternative X will emerge, relative to the others, is not clear beforehand. Nevertheless, the estimating procedure will then determine its probability of being the correct result.

One embodiment of this system and method, then, is to assume there is another alternative, Alternative X, take the best estimate of its properties, and then see how it performs relative to the other known alternatives. The result is then the probability of that other alternative, yet unknown.

The probability determined for Alternative X then represents the estimated chance that something unknown was missed and is thus the probability that one will be surprised, blindsided or will have missed an opportunity. In general, in real life, there is usually the chance something was missed, and the probability given for Alternative X provides an estimated chance of that.

As noted above, the probability of Alternative X also provides an indication of when to stop working on the decision or choice of action. If that probability is fairly low, then it is likely the user has explored the decision well. If that probability is high, then the user should continue working because it is likely something else should be considered before the decision is made.

Surprisingly, when users are confronted with a numerical probability for Alternative X, they often think of a new alternative, issue or factor that they missed. In other words, the impact of this result may be psychological, and not just statistical or mathematical. For instance, suppose that Alternative X turns out to have an 18% chance of occurring. People then see that they have an 18% chance of being blindsided since there is an 18% chance they missed something. Most people are not previously aware of this high probability of having missed something, and at this point, they often think of what they might have missed.

In more technical detail, there may be envisioned a situation where there are n criteria and m regular alternatives, excluding Alternative X.

The user inputs the n criteria (the factors listed in the yellow to the left in FIG. 2). If i denote the criteria, then $i=1, \ldots, n$.

Also, the user inputs the m regular alternatives. Alternative X is designated as alternative m+1. (The alternatives are along the top in blue in FIG. 2.) If j is the index for the alternatives, then $j=1, \ldots, m+1$.

Rij denotes the numerical rating of alternative j on criterion or factor i. As noted above, if symbols are employed such as in FIG. 2, then they may be transformed into a numerical value by the software via a table that can be adjusted by the user.

The user may input the Rij (or their symbolic equivalent) for all of the regular alternatives, that is, for $i=1, \ldots, n$ and $j=1, \ldots, m$.

The weight factor will contribute to the calculation of Rij. A weight of High will make Rij more important so it has greater impact on the outcome. A weight of Low will decrease the impact of Rij.

Alternative m+1, however, is different since it refers to Alternative X, which is unknown. As noted, the ratings for that alternative may be Neutral or Not known, since nothing is known about it. For Alternative X, the system may input the Neutral ratings on all criteria automatically.

Now that Alternative X has all of its ratings on all of the criteria, it is just like the other alternatives, since they also have all of their ratings on all of the criteria. The system can then treat Alternative X just like other alternative.

Most of the actual calculations are based upon the ratings, Rij. In a Bayesian interpretation, the Rij represent the conditional probability of the factor or criterion i, $i=1, \ldots, n$ given the alternative j, $j=1, \ldots, m$.

One special rating is the initial starting value for column j (alternative j), $R_{0,j}$. These provide an initial starting value or in Bayesian terms, "a priori" information.

In one embodiment, for i=0 the initial or a priori rating $R_{0,j}$ will have the value $$R_{0,j}=1/(m1) \tag{0.1}$$

That is because there are m+1 alternatives and if nothing is know about any of them a priori, they are all equally likely, at least initially. In other words, when first starting out and before doing any ratings, nothing is known about the different alternatives. Hence, they start out by being equally likely. Of course, as soon as one commences rating the different alternatives against the various criteria, that will change.

Systems and methods according to embodiments of the invention now determine, for any alternative, the probability that it is the right choice.

One of the important calculations is to obtain a value for each alternative j, i.e., Vj. In one embodiment Vj will be proportional to the chance that a given alternative is the best choice. Mathematically, Vj is a function of the ratings given for alternative j.

$$Vj=Vj(R0j,R1j,\ldots,Rnj) \tag{0.2}$$

where there are n criteria, facts or factors.

For any alternative, the higher its ratings Rij, the higher the value of Vj. That is because the Rij represent how much the criteria support the particular alternative. The better the alternative does on the criteria, the higher its value of Vj.

A variety of functional forms for Vj are possible. They can be a simple sum or weighted sum or a product or a more complex relationship of the various ratings Rij. In one system and method, they are a product. That is, $$V_j = \prod_{i=0}^{n} R_{i,j} \tag{0.3}$$

Often, as in FIG. 2, it is useful to normalize the values so they sum to 1. Then they can be interpreted as probabilities. More precisely, the probability that Alternative j is the correct choice is given by the value of Vj divided by the sum of all Vj, the sum being over all the alternatives.

$$Pj = Vj \bigg/ \sum_{k=1}^{m+1} Vk \tag{0.4}$$

This implies $$\sum_{j=1}^{m+1} Pj = 1 \tag{0.5}$$

The Pj are important as they represent the probability an alternative is the best choice.

It should be noted that the above steps follow a Bayesian approach. More precisely, the Ri,j then are interpreted as conditional probabilities. Pj is then interpreted as the probability alternative j occurs, given the information provided by the factors and criteria. That means, if the preferred steps are followed, that the Pj probabilities obtained will be Bayesian estimates. Of course, the systems and methods of the invention are not limited to Bayesian approaches. Other probabilistic techniques may also be used, as are noted below.

As discussed in detail above, Alternative X thus provides an estimate about what was missed, that is, what is unknown. Systems and methods according to embodiments of the invention may also divide those unknowns into known-unknowns and unknown-unknowns. That makes the type of risks clearer.

Figure 4:
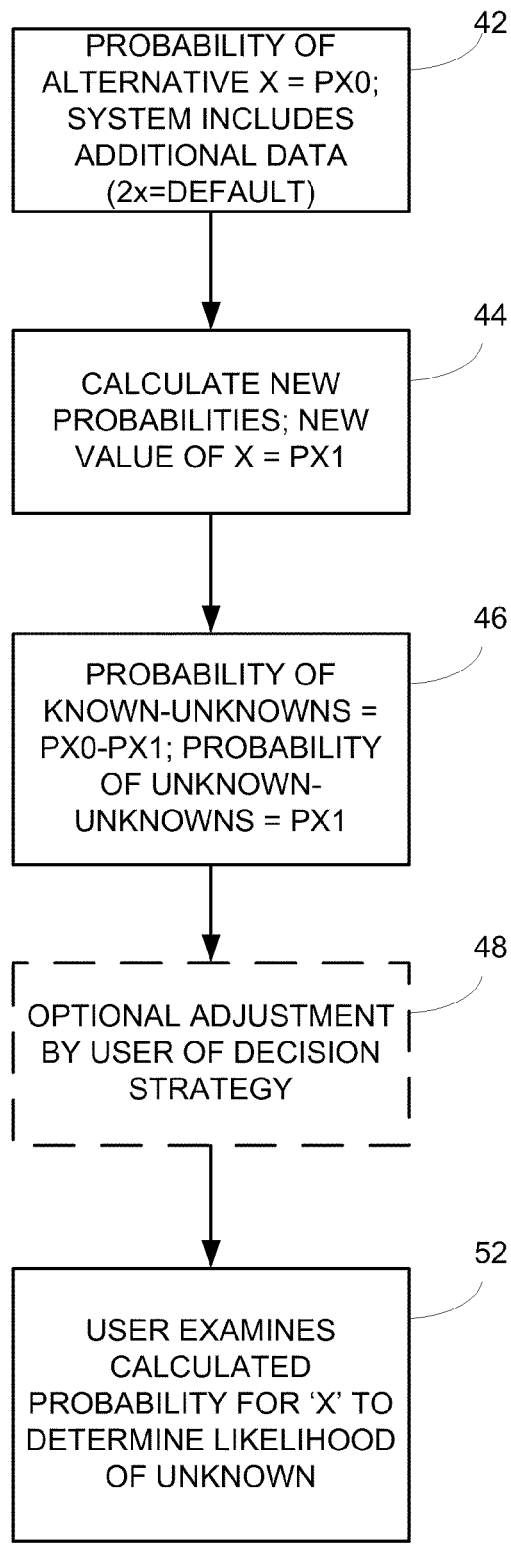
FIG. 4 is a flowchart showing a method of dividing unknowns into known-unknowns and unknown-unknowns.

Referring to FIG. 4, to estimate the known-unknowns, the procedure assumes that a new batch of information is provided that has the same quantity of information as the information already obtained. This is because, if the procedure continues as data is entered, the best statistical estimate of the value of the information obtained in the future will be the value of the information obtained in the past. For instance, if a baseball player is batting 0.300, the best estimate of what he will continue to bat is 0.300. Unless there is additional special information, the best guess about future behavior is past behavior.

Thus, to develop the known-unknowns, the procedure may assume initially that the data exhibits the same behavior as the past and that a new batch of information is collected (step 42) that adds a quantity of information the same size and value as the information already collected. The procedure then recalculates the probability scores (step 44), now assuming a new batch of information is included. The initial probability of Alternative X is PX0, and the new probability is denoted PX1, and this is also the probability of the unknown-unknowns (step 46); the probability of the known-unknowns is PX0-PX1 (also step 46). This then provides statistically reasonable estimates for the probabilities of the Known-unknowns and Unknown-unknowns. The user may adjust their strategy based on this information (step 48), and finally may examine the calculated probability for Alternative X to determine the likelihood of an unknown outcome occurring (step 52).

Figure 5:
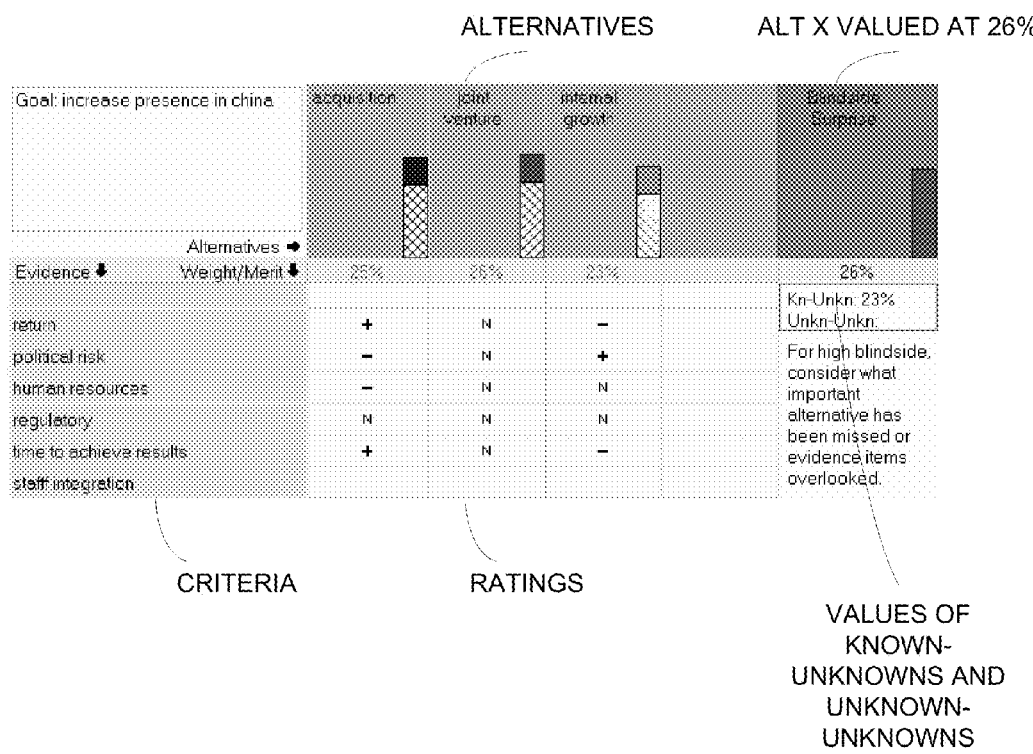
FIG. 5 shows a sample data entry grid, showing results and an Alternative X (here termed "Blindside Surprise").

FIG. 5 shows a sample data entry grid, showing results and an Alternative X (here termed "Blindside Surprise"), showing a division into known-unknowns and unknown-unknowns as calculated above. This figure, like FIG. 2, shows how the system and method may coordinate the inputs and outputs on one page, improving ease of use.

Referring back to FIG. 1, the next optional step in the overall method is to identify anomalies, such as biases or erroneous assumptions (step 18). In particular, the system and method may highlight information that it suspects might reflect biases or erroneous assumptions, which reflect considerations or factors that are "out of kilter" or "out of step" with the other information.

Figure 6:
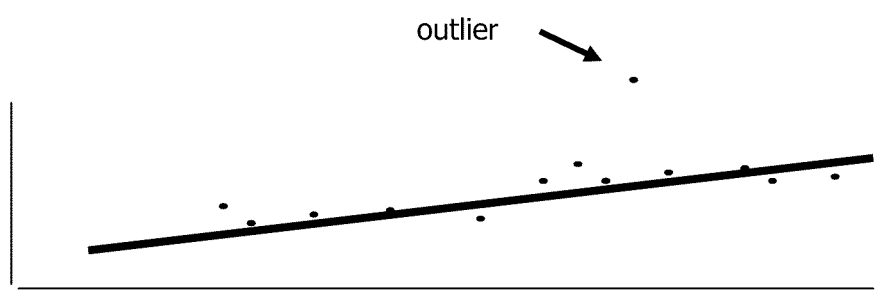
FIG. 6 shows a scatter plot containing outlier data.

In particular, the system and method detect factors that are "out of line", herein termed "outliers" (see FIG. 6). These are points that are "out of line" since they are distant from where the rest of the data suggest they should be. The system and method may automatically highlight the outliers as possibly due to bias or due to other incorrect assumptions. Many statistical techniques to do this may be employed, including determining percentage deviations from an average, etc. Once highlighted, the user may be required if desired to affirmatively review the outlier for possible bias or incorrect assumptions.

Of course, not all outliers will be due to bias or faulty assumptions. But generally they are at least considered initially suspect, and the system and method highlights the same so that they can be re-inspected and double-checked.

In more technical detail, first, for each individual criterion, i=1, . . . , n, one software implementation may calculates the average rating, which may be the average rating across a row, as in FIG. 2. The row average is calculated over the m regular alternatives. This means that alternative m+1, which is the unknown alternative, Alternative X, is excluded from this calculation.

More precisely, the following is calculated for each criterion (row):

$$AVG_i = \left(\sum_{j=1}^{m} R_{i,j}\right)/m \qquad (0.6)$$

Next the system and method determines by how much the rating deviates from the average. The deviation is in the next equation:

$$DEV_{i,j} = R_{i,j} \cdot AVG_i \qquad (0.7)$$

The deviation is an indication of how much that particular rating is out-of-kilter or out-of-line with the other ratings for that criterion.

It should be noted that other measures of deviation could also be employed, including variance, absolute deviation, and so on. A further deviation measure would be a derivative, such as the derivative of the value of alternative j with respect to the rating of $R_{i,jj}$, or the derivative of the difference in the value of alternative j from other alternatives with respect to the rating, $R_{i,j}$. The gain or loss in entropy can also be employed.

Next the system and method may weight each deviation, dependent upon the alternative j. If that weight is denoted $W_{i,j}$, then if $$W_{i,j} = 1 \qquad (0.8)$$

then all alternatives are equally weighted.

In one representation, for i=1, . . . n $$W_{i,j} = W_j P_j = \qquad (0.9)$$

In this case, the weights are the probability that alternative j is the correct choice. In other words, the more likely an alternative is to be correct, the more weight is placed upon that deviation. The alternatives more likely to be correct receive more weight because they are likely more important in making the decision.

At this point, for a given criterion, all of the weighted deviations are given as in the next equation. It is noted that the absolute value is employed here because only the magnitude of the deviation is of interest. More precisely, the weight $W_{i,j}$ is multiplied by the absolute value of the $DEV_{i,j}$.

$$W_{i,j}(|DEV_{i,j}|) \qquad (0.10)$$

The weighted deviations, (0.10) may now be ranked or sorted. In some embodiments this may require two separate ranking (sorting) procedures.

First, for a given criterion i, the system and method may rank these weighted deviations over the regular alternatives j=1, . . . , m. That is, for a given criterion i (row), there are m weighted deviations for j=1, . . . , m. Those m numbers are ranked from largest to smallest.

There are n of these, one for each criterion (row). At this point the "worst" weighted deviation in each row i (that is, for each criterion i) has been obtained.

Second, these "worst" (weighted) deviation values are ranked from largest to smallest. More precisely, next the system and method finds the row with the worst, worst deviation. This is the worst of the worst. The second worst, third worst and so on down are also obtained.

In other words, two ranking are occurring. First, for each criterion, the largest deviation across a row is obtained. This provides the worst in any row. Next, the worst of the rows are ranked to determine the worst of the worst.

The higher the rank of any particular weighted deviation, the bigger the deviation, and the more likely it reflects a bias, hidden assumption or other anomaly.

Figure 7:
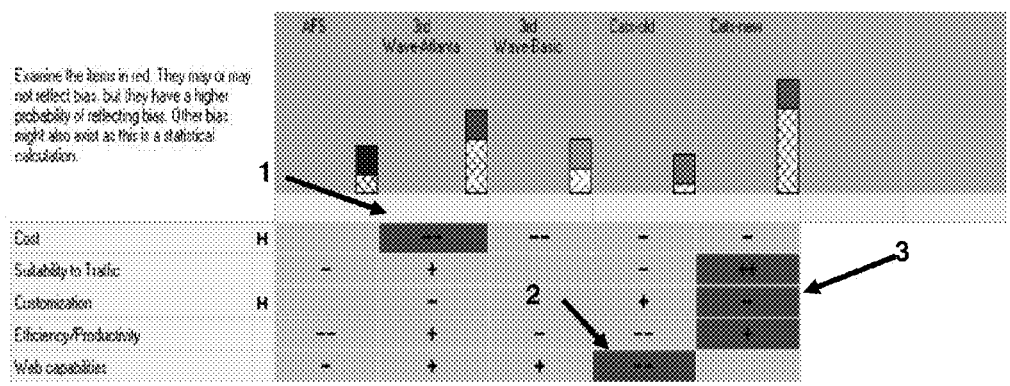
FIG. 7 shows a representation of large deviations from an average value.

The results of this ranking are then displayed. Referring to FIG. 7, only the top five are shown. As with FIG. 2, the alternatives are along the top and the criteria, facts or factors are along the left side. The vertical bars along the top (cigarette bars) are proportional to the probability that particular alternative is the best choice. In FIG. 7, the alternatives being considered are different IT systems, and these are being evaluated on various different criteria.

The red highlighted cell in a row represents the worst deviations in that row. The top row is the worst of those worst deviations, and on down in rank order.

For instance, consider the red cell at the location denoted '1'. The double minus indicates a very strong negative value for that alternative. That cell is decreasing the probability that alternative is the best choice. The system and method may highlight that information and thereby invite user interaction to check that the information does not reflect a bias or erroneous assumption.

Generally, the ratings are particularly useful in revealing bias, preconception or a hidden assumption. For instance, suppose the user is biased in favor of a particular alternative. Then they might deliberately put in numbers for that alternative that are higher than they should be. Concomitantly, numbers might be inserted into the other columns that are too low, thus making the other alternatives less likely.

More precisely, if one considers a specific criterion and examines its corresponding row, if the user is based toward a particular outcome, the rating number in the corresponding column is likely to be higher than it otherwise should be. Also, the numbers in the other columns might well be lower than appropriate. Further, if the bias was effective in influencing the outcome and in creating a winner or leading contender, then if the column is a "winner" or leading contender, it will have its numbers disproportionately raised. If the column is a "loser" or a weak alternative, then its numbers would be disproportionately lower.

This leads to a rule for identifying ratings that are suspect in that they might reflect bias or a hidden assumption. Specifically, entries are examined that are disproportionately higher than others in the same row, particularly if those ratings are associated with a leading alternative. Similarly, entries may be examined that are disproportionately lower than the others in a row, particularly if they are associated with alternatives whose results are weak. To avoid the identifying entries that are irrelevant to the decision or analysis, the anomalies that are more important to the decision may be emphasized. Due to this rule, simple statistical procedures may be employed to identify ratings that might reflect bias, preconception or assumption.

This particular rule considered ratings for the same criterion, that is, along the same row. Since these rating are relative to the same criterion, they have a similar basis, so the bias it more likely to be apparent. In effect, distortions due to different criteria are eliminated, and hence the statistical analysis is not contaminated by that type of noise. Nevertheless, other statistical procedures can also be employed along these lines, namely, the identification of ratings that are anomalous in that they are somewhat distinctive from other ratings.

Figure 8:
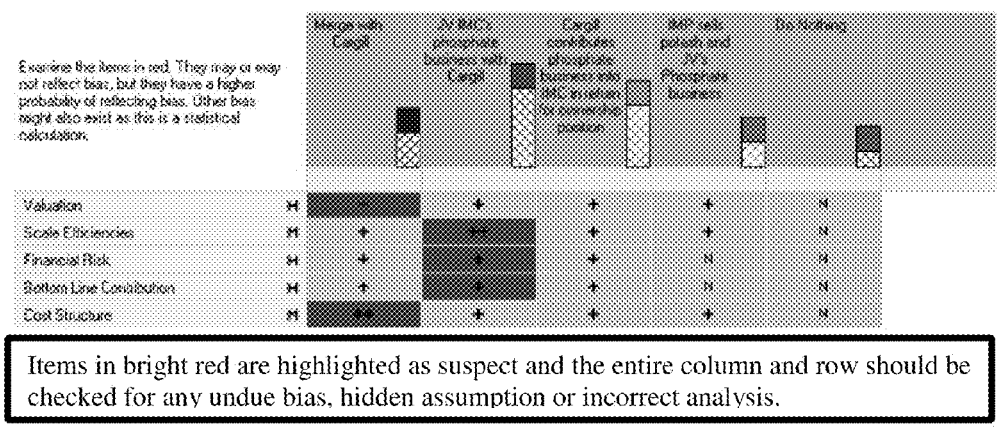
FIG. 8 shows how anomalous or suspect ratings may be highlighted in a matrix format.
Figure 9:
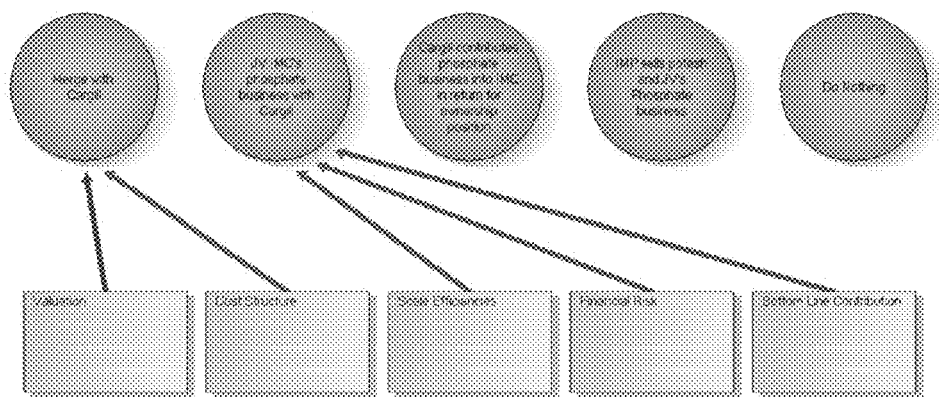
FIG. 9 shows how anomalous or suspect ratings may be indicated in a graphical form of arrows connecting various criteria to different alternatives.

Once identified, anomalous or suspect ratings may be highlighted in a matrix format (FIG. 8) or in a graphical form of arrows connecting various criteria to different alternatives (FIG. 9).

Referring back to FIG. 1, the next optional step in the overall method is to identify predictive factors (step 22).

In particular, based upon the information and data input by the user, systems and methods according to certain embodiments of the invention may not only predict which alternative is most likely to occur, but also, after the event has occurred and the actual outcome is known, they may indicate which factors were predictive and which were not.

In more detail, experience has demonstrated that, in many cases, most of the factors employed have minimal predictive value and usually only a few factors determine the outcome. Knowing those critical factors can significantly enhance results, and certain embodiments disclosed may identify those factors. These may even identify situations where the user has a significant possibility of being in error because of inconsistencies in the data or insufficient data. By warning the user of such situations, the system helps prevent error.

In even more detail, the system may be employed to determine which of the original factors accurately predicted the correct event and which did not. This may be important information because one may wish to employ factors that predict what will occur, not ones that fail to predict. Identifying factors that were predictive for events whose outcomes are now known can help significantly with future predictions.

If one of the original alternatives turned out to occur, that is, to be the correct choice, then the factors whose ratings were positive for that alternative were the predictive factors. Conversely, factors in the original ratings whose ratings were negative for the correct event were wrong because they were against the event that actually occurred and pointed in the wrong direction. For example, and using the graphical format described above, a factor with a double plus for the correct outcome would be predictive. A factor with a double minus for the correct event would not be predictive, in fact, it predicted incorrectly.

However, just because a factor had a positive rating for the correct alternative does not mean it had much value in predicting the event. For instance, suppose a given factor has double pluses for every alternative. (In FIG. 2, the row would have double pluses across it.) That is less useful for this purpose because it does not discriminate: all alternatives have the same double plus rating. To be helpful, the rating has to be disproportionately positive compared with the other ratings for that row. Likewise, to have negative impact, the rating must be disproportionately negative relative to the ratings for the other alternatives.

A useful measure of this disproportionate influence is the deviation described above, and that is one measure the system and method may employ. From equations (0.6) and (0.7), the preferred manifestation of the measure is:

$$DEV_{i,j} = R_{i,j} AVG_i \qquad (0.11)$$

In row i note $R_{i,j}$ pertains to alternative j, and suppose $R_{i,j}$ and $DEV_{i,j}$ are both strictly positive. Then alternative j should receive a distinct increase versus the other alternatives, since $R_{i,j}$ is distinctly above the average rating in that row.

For a given alternative j, the software may calculate these deviation values. Then it ranks them from the most positive to the most negative, where the ranking is over the criteria or factors i, i=1, . . . , n.

Given that ranking, the factors with the most positive deviations were likely the most predictive of alternative j. The factors associated with the most negative deviations were likely the most incorrect or inaccurate in predicting alternative j.

In one embodiment, the top ten predictive factors are listed, as well as the ten that were most inaccurate.

Figure 10:
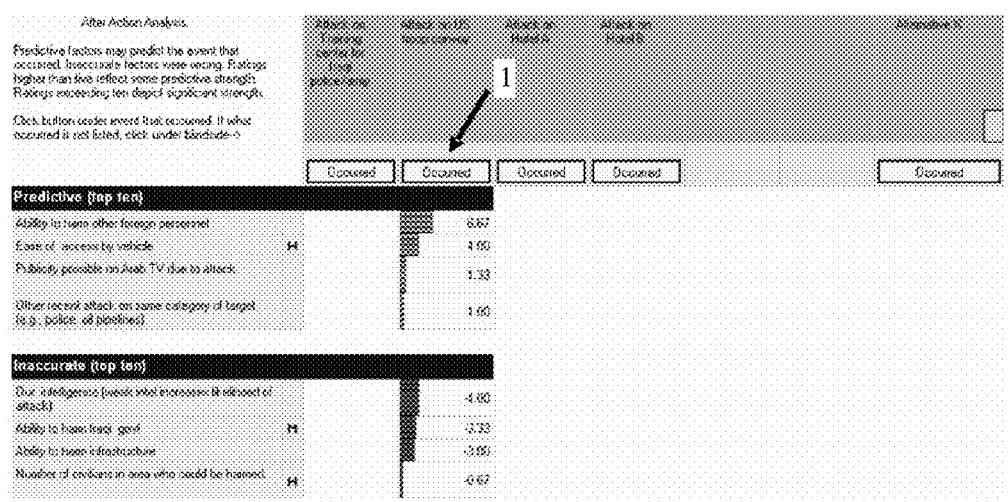
FIG. 10 shows how predictive factors may be highlighted in a matrix format.

FIG. 10 depicts an example. In this example, one is concerned about where a military attack may occur. First a prediction may be made about where the attack would occur. A short time later the actual attack occurs, and in this example it was an "Attack on the US troop convoy".

The user clicks the "occurred" button for the alternative that actually occurred. If the event that occurred was not listed as an alternative in the original analysis, the user clicks on the "occurred" button under "Alternative X".

The factors that were predictive (in green) and the factors that were inaccurate or incorrect (in red) appear. In the embodiment of FIG. 10, at most 10 are listed in each category, though this number is arbitrary. The predictive factors had the highest positive deviation values. The inaccurate factors had the most negative deviations.

In FIG. 10, many factors are displayed in red, that is, are deemed inaccurate. That means those factors were wrong in the original forecast and were not predictive. The system and method has thus discovered that many of the factors or criteria employed were poor predictors and predicted inaccurately.

The event might have already occurred, but knowing which factors predicted correctly and which predicted incorrectly can help to improve predictions in the future.

Referring back to FIG. 1, the next optional step in the overall method is to identify risks (step 24). Risk poses a serious problem because in most decisions the analysis of risk is informal and haphazard. That is clearly inadequate since risks can inflict harm and damage. Systems and methods according to embodiments of the invention ferret out and highlight risks, making it very difficult for the human user to overlook or neglect their appropriate consideration.

Much of the critical information about risks may be obtained when the data are input. In one example, several alternatives may be given, say Alternative A, Alternative B and Alternative C, and one may want to determine which is best. The alternatives are rated on different criteria, say price, performance, reliability, flexibility and so on.

In one example, Alternative A does well on price and well on flexibility, and Alternative B does poorly on price and also poorly on flexibility. Depending upon the ratings, the system and method then estimate which particular alternative is likely the best choice.

The ratings information also suggests where an alternative is strong and where it is weak. That provides the risks, since the weaknesses are typically the risks. In the above example, the poor flexibility of Alternative B is a risk with that system.

It is important to note that the strengths are also often risks, and the system and method may identify these as well. For example, in one weapons system example, Alternative A may appear to be the best because it will integrate well with other systems. In this case, its integration capability is a strength.

That strength, however, is also a risk. When installing a system corresponding to Alternative A, one has to be sure that it can integrate well with other systems. In other words, Alternative A was selected for installation because it had an important strength, the ability to integrate with other systems. But now that strength must be realized and achieved, so the same becomes a risk. That is why systems and methods according to certain embodiments of the invention highlight that type of information.

Thus, the systems and methods may examine the ratings input by the user, which reveal the strengths and weaknesses. A sorting then provides a ranking and determines the most critical strengths and weaknesses for a given alternative. With the system expressly highlighting risk information, the decision maker can then take action to counter the risks. One advantage to doing this is to counter confirmation bias. Users naturally tend to adhere to their own viewpoints and opinions, sometimes to excess, and they tend to believe supportive information but to disparage and downplay information to the contrary. Confirmation bias is inherent in the human mind, and since users are generally unaware of doing it, impediments and risks are frequently disregarded or overlooked. The systems and methods disclosed here help to resist this cognitive error not only by identifying risks and dangers, but also by providing means to mitigate their potential harm.

To consider the highlighting of risks in more detail, the user may first select a particular alternative j. Then the software ranks the risks, $R_{i,j}$, for that alternative. Here the ranking is over the n criteria, $i=1, \ldots, n$. The result is a ranking list of the criteria for alternative j, from the ones with most positive rating to the ones with the most negative.

The ones with the most negative ratings are then displayed as risks. The most positive are also displayed in a separate list, since the strengths might also be risks as described above. In one embodiment, only the top few in each category are listed (see FIG. 12). The "Positive Factors" are the strengths. The "Negative Factors" are the weaknesses. In addition, there are also three columns depicted entitled: "Action", "Ownership" and "Monitoring/Performance Measures". For each risk, the user may insert what action will be taken, who will be responsible, and any monitoring or performance measures that will evaluate the action or monitor progress on implementing the action. These three columns help ensure actions are taken to ameliorate the risk.

Referring back to FIG. 1, the final step in the overall method is to display the results (step 26). The methodology of the display is described above and below in the context of the system and method details.

A variety of ancillary issues and examples are now described.

One problem with prior decision support software packages is the algorithm itself. Algorithms greatly differ on how well they handle errors, and many actually make the errors worse. Technically the issue is elasticity, i.e., how much do errors in the input influence the error in the output. For example, if the input data have a 10% error, it may be desired to know if the output is in error by a similar percentage or if the output error is higher or lower. Elasticity is especially important in complex decisions since the data often have errors, are insufficient, or both. The systems and methods according to certain embodiments of the invention have an unusually low elasticity that can provide the correct answer despite a range of errors and difficulties in the data.

Two examples are provided below to clarify how different algorithms might increase or decrease error.

EXAMPLE 1

Error Increase

In this example, which is indicative of prior systems, the revenue in a business is 100 (in millions of dollars). The costs are 95. Hence, profits are 5.

| | |
|---|---|
| Revenue = | 100 |
| Costs = | 95 |
| Profit = | 5 |

But in this example there are a variety of problems so there is an estimated 10% error in the revenue figure. The real revenue, thus, is anything from 90 to 110. For simplicity, it is first assumed the costs remain at 95. Now the problem becomes

| | |
|---|---|
| Revenue = | [90 to 110] |
| Costs = | 95 |
| Profit = | [−5 to 15] |

Originally, the profit was believed to be 5, but due to the error in the input information, it could be from −5 to 15. In other words, due to the procedure employed, an input error of 10% balloons to a perhaps 200% output error. The elasticity here is inordinately large since this is a very large increase.

EXAMPLE 2

Better Algorithm

A different procedure might treat the errors in a superior manner. To illustrate, in this example there are 60 white balls and 30 red balls. Thus the percentage of white balls is 66⅔%:

$$\frac{60}{60+30}$$

Now it is assumed that an error has been discovered. There were not 60 white balls, but 70. This is a 16⅔% error in the input (10 on a base of 60).

The correct result is thus 70% white balls:

$$\frac{70}{70+30}$$

Previously it was believed that the percentage of white balls was 66⅔ when it really was 70. That is an error of 5% in the output (3⅓ on a base of 66⅔).

The input data was in error by 16⅔%. However, the final result, the output, was in error only 5%. In other words, the input error of 16⅔% has been reduced to 5%, less than ⅓ as large.

The two different example procedures above treated the errors quite differently: one vastly increased the error while the other reduced it. It is a matter of the elasticity. In designing an algorithm there are many choices, and depending upon the choice the procedure employed can either increase the error or decrease the error, and sometimes dramatically so.

Systems and methods according to certain embodiments of the invention were designed to have low elasticity; their underlying algorithms as described tend to attain the correct result despite certain errors and inaccuracies in the input data.

In other words and according to research, even when the data are wrong and the corresponding probabilities contain large errors, the system and method still performs well in providing the correct results. Many common decision approaches have high elasticity and do not perform well when faced with imperfect data. By being expressly designed to have low elasticity, the system provides the correct answers when many other approaches will not.

EXAMPLE 3

Figure 13:
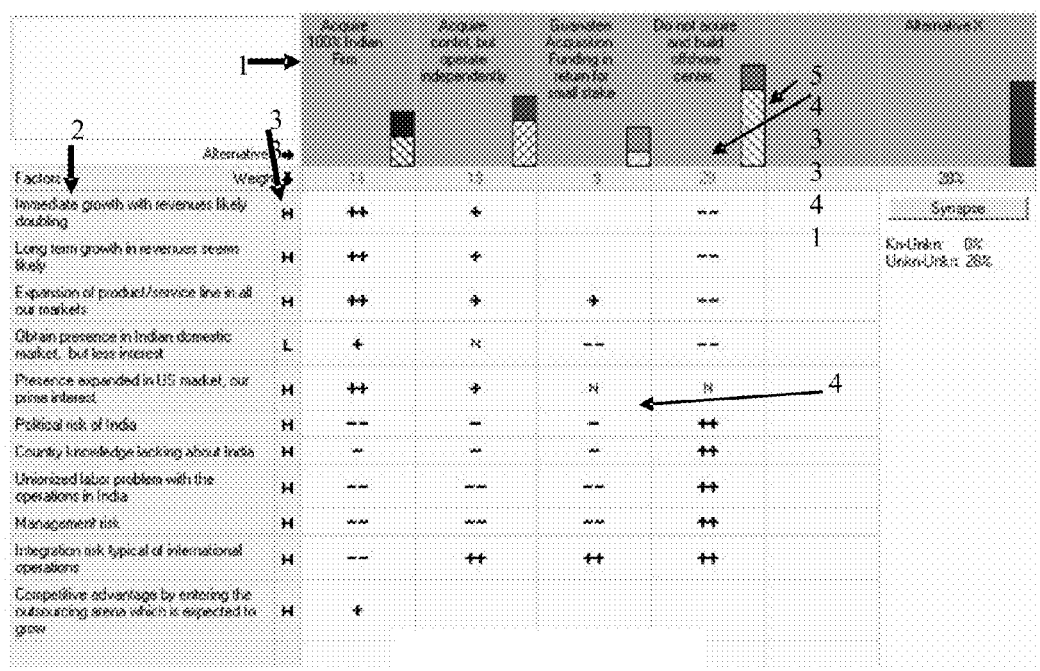
FIG. 13 depicts an exemplary grid to analyze a decision about acquiring a firm in India.

FIG. 13 depicts a decision about acquiring a firm in India. Along the top in blue (at arrow 1), the different alternatives are listed. Along the left side in yellow (at arrow 2), are the criteria that are employed to select the best alternative. In the column at the right side of the yellow (at arrow 3), are provided the weights of the importance of each criterion factors, in this case they range from Low, Medium to High.

At arrow 4 is a large white group of cells with plus and minus ratings. Blank cells default to neutral. These cells depict how each alternative rated on each criteria. Across a row are the ratings given the different alternatives for the specific criterion or factor. For example, the possibility "Acquire 100% of Indian Firm" received a double plus on the factor "Immediate growth with revenues likely doubling". Also along the top in blue are cigarette-like bars and corresponding numbers (see arrow 5). The numbers are the probability that the corresponding alternative is the best choice. The bar height is proportional to the probability number. These numbers are calculated by the software as described above using Bayesian or any number of other probabilistic strategies.

EXAMPLE 4

The software permits a direct, head-to-head comparison of any two alternatives, including a check of financial information as will be described.

The direct comparison of any two alternatives considers the ratings each alternative obtained on the different factors. What is special is that only the factors where the ratings were different are displayed. If the ratings were the same, or essentially the same, on some specific factor, it has no impact on which alternative is superior. Therefore, it is not displayed. For example, both alternatives may receive a plus rating. Then that rating did not discriminate between the two alternatives, and is not displayed.

The mechanism is straightforward. Via a choice menu, the user selects which two alternatives to compare. The software then examines the ratings for the two alternatives. Only the factors where the ratings are different are displayed.

It should be noted that often only a few factors appear because the ratings are the same for most of the factors. This provides a significant simplification. Also, the difference between the ratings is determined and then ranked. In one embodiment, the factors are shown in order of the greatest difference of the two ratings. Thus, the factor where the two ratings were most different will be on top and so on down the line.

Figure 14:
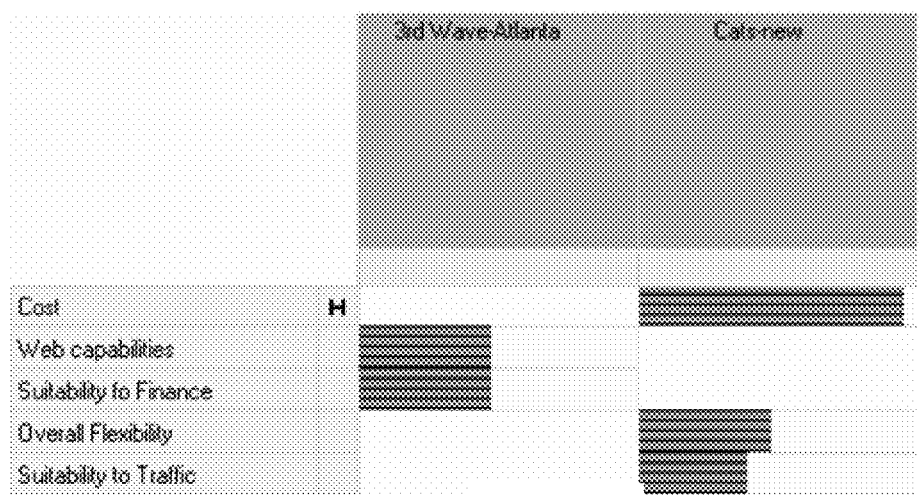
FIG. 14 shows an example representation showing a comparison of two alternatives. A bar proportional to the difference is displayed under the alternative that is higher on that factor.

A bar proportional to the difference is displayed under the alternative that is higher on that factor. See FIG. 14 for an example representation of the comparison of two alternatives. Of all the criteria, the two alternatives had different ratings on only five. The green bars are proportional to the amount of difference. The column the green bar is in indicates which factor was superior on that criterion.

A financial comparison takes the above analysis a step further. The user selects which two alternatives to compare. As before, only the factors where they are reasonably different are shown. However, the software may insert an additional column for each alternative, a value column. Into that column the user may type the value of that alternative, and usually this will be the financial value, but could be other values such as cost, utility, benefit etc. The user might have to independently estimate these values, but in any case they are entered in the appropriate cells.

The software sums the value of each column and displays that at the top of each value column. The difference of the two sums is also displayed in the "Net Value Comparison".

FIG. 15 shows an example. Each alternative has two columns. One column has the original ratings that were input, the various pluses and minuses. In the other column, the VALUE column, the user enters the value of that particular factor.

In FIG. 15, the user felt that the "cost" criterion rated a value of −100 for "$3^{rd}$ Wave-Atlanta," and +100 for "Cats-New". The total value for the five criteria, shown at the top of each value column, is 1300 and 1150 respectively. The net difference is displayed under "NET VALUE COMPARISON" and is 150.

This feature provides a quick cross-check on the financial projections. It compares the value of any two alternatives. Only the factors where the two alternatives are different are considered. That makes obtaining the needed entries very quick.

To detect deviations, the user may click on a "Detect Deviations" button, and one or more cells become highlighted in red, as in FIG. 16. In this function, the software has conducted a regression and highlighted cells that are outliers. Specifically, the software translates the plus and minus ratings into numbers. Those numbers are regressed against the values entered that correspond to that rating. The result is that an approximate financial value is obtained for each of the plus or minus values. That is, a plus will have an approximate financial value, and same with the other symbols.

Value entries that differ significantly from the approximate values are then highlighted in red.

In FIG. 16, the cells corresponding to "Cost" for "$3^{rd}$ Wave-Atlanta" are highlighted in red. A double minus is entered with a value of −100. The software has determined that giving a double minus a value of −100 is atypical. It is therefore highlighted for the user to check.

Although the disclosed embodiment employs regression, other approaches to estimate the value corresponding to the ratings may be implemented. For example, one could take the average financial value of the factors given a plus rating, and similarly for the other ratings.

Figure 17:
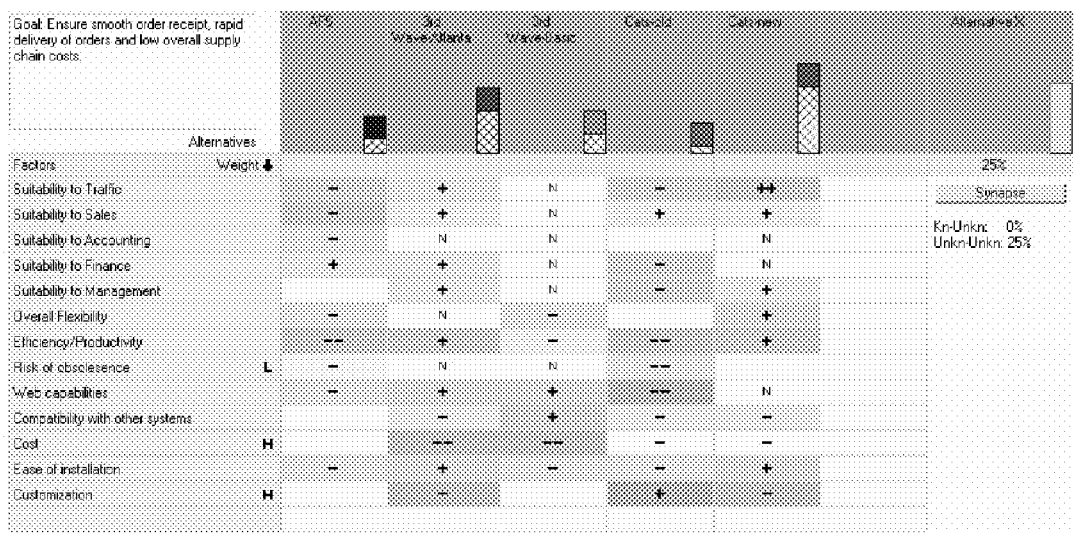
FIG. 17 shows a color map.

It is also noted that colors may be employed extensively for convenience and for ease of display of results. Such color maps are sometimes termed "heat maps". FIG. 17 shows such a color map. The user can turn this on by clicking a thermometer icon. Green indicates a cell that supports the alternative. Red is a cell that is against the alternative. The darker or deeper the color, the stronger that cell's impact on the result. The deeper and darker cells are usually the most important.

The colors of the heat map are determined from the equations (0.6) and (0.7), and employ the deviation measure. The preferred manifestation of the measure is $$DEV_{i,j} = R_{i,j} AVG_i \quad (0.12)$$

For a given cell, the more positive the deviation value $DEV_{i,j}$, the deeper and darker the green color for that cell. The more negative the deviation value, the deeper and darker the red color.

The value of the color map is that it quickly conveys the reasoning behind the ratings entries.

Figure 18:
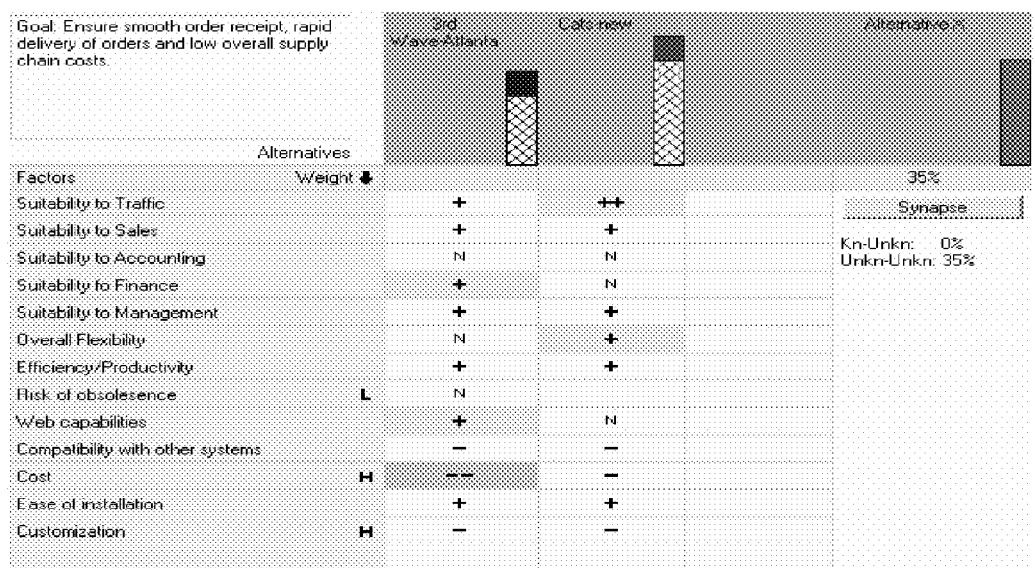
FIG. 18 shows a simplified color map.

In FIG. 17, some of the columns have numerous red cells, indicating that those alternatives are weak. The software permits columns to be eliminated. FIG. 18 depicts the results after those weak columns have been deleted.

In FIG. 18 it is noted that the colors have been simplified. For most of the factors, the ratings for the two columns are the same, meaning that no color is applied. The fewer cells in which there is color simplifies the analysis.

This situation is typical. As the weaker alternatives are eliminated, the noise is reduced and the colors clarify and simplify. It becomes easier to see the underlying argument. The colors thus convey considerable information about the analysis and which alternative is likely the best.

FIG. 15 showed how financial values may be incorporated. Similarly, FIG. 19 indicates how numerical values may be determined. In this example, an estimation is made of the value of a firm. First, the reasonable range of the value is determined from low to high. Second, that range is subdivided into discrete segments or numerical intervals. Those segmented values are then entered along the top, i.e., in the blue section.

In this example, the range of the firm's value is from $95 (in millions) to $120. This is divided into five segments, $95, $100, $105, $110, $120 that are the alternatives and are inserted along the top in the blue section. Third, along the left side, in yellow, the user inputs the various criteria and factors that are deemed to determine the numerical value. Fourth, the user then indicates by entering plus or minus values in the cells, which alternative seems most likely for the factor being considered.

Figure 19:
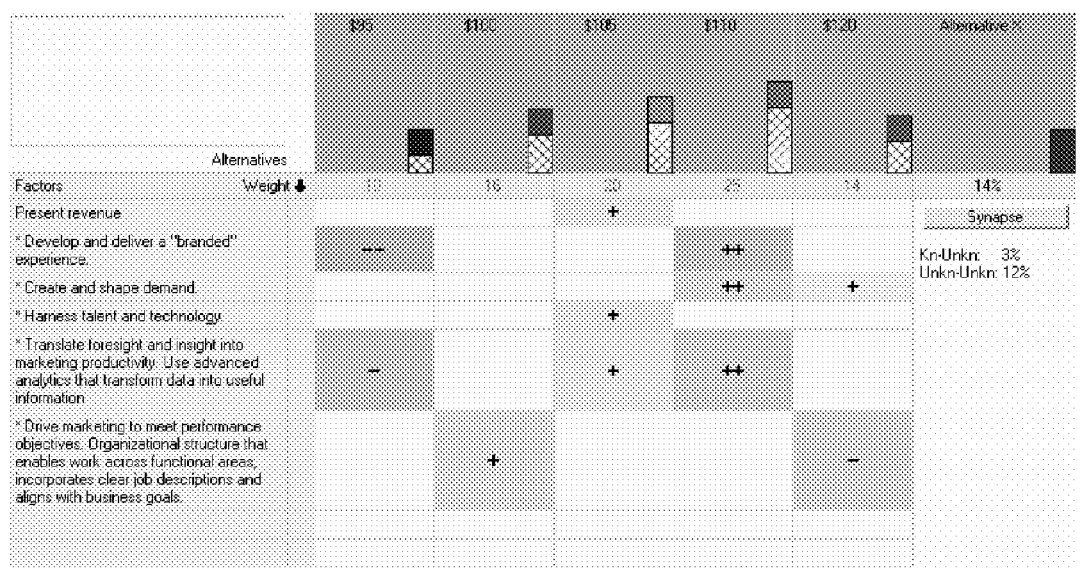
FIG. 19 indicates how numerical values may be determined.

In the example of FIG. 19, several factors may be seen to determine the value of the firm including "Present revenue" and "develop and deliver a "branded" experience", and these are entered on the left.

To accomplish the ratings, for the factor "present revenues", the exemplary user believed, for that specific factor, that the value of the firm would most likely be $105 and thus inserted the plus in that cell (see the plus sign in the cell in the $105 column and the row corresponding to "Present revenues").

For the factor "develop and deliver a "branded" experience" the exemplary user believed that based upon that factor, the value of the firm might be $100. For that factor, the user also felt that $95 was not likely, and so inserted a double minus in that column.

The same is done for each factor on the left. That is, the most likely value of the firm value, based upon that factor alone, is determined and the corresponding pluses or minuses are entered. The stronger the performance of that factor, the higher the numerical value selected.

Conceptually, the various factors on the left are what cause the numerical value. In the example, the performance of the factors was what was believed to produce the firm's value. The ratings input are an estimation of how well a given factor will perform and contribute to the firm's value.

As discussed below in connection with FIG. 20, the user can employ templates or guidelines to help determine the ratings entries in the cells. However, they are determined, the user would complete entering the plus and minus values in the cells and do this for each factor on the left. FIG. 19 employs plus or minus values, but other values can also be entered into the cells. These other values could be other symbols or numerical in nature. This could be entered by the user or from other software.

The next step is, by examining the height of the columns for each of the different alternatives, i.e., in blue along the top, the user can determine what is the most likely number for the numerical value being sought. The estimated probability each of those is correct is also presented.

In this example, the value slightly below $110 appears reasonable.

Figure 21:
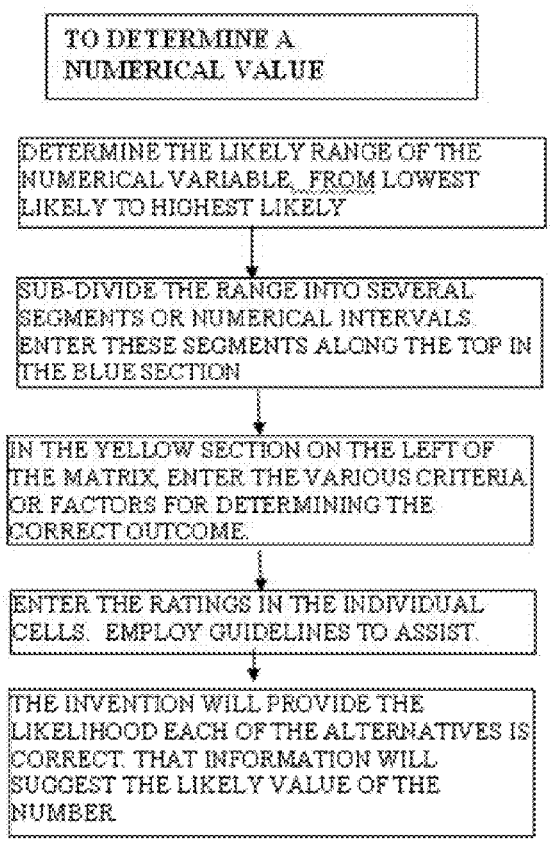
FIG. 21 illustrates an exemplary method to determine a numerical value.

In essence, the standard features of the basic decision matrix were employed, but for an application slightly different from those previously mentioned. In this instance, they were employed to determine a numerical value. FIG. 21 illustrates an exemplary method to determine a numerical value.

As noted above, to help the use enter the plus or minus values, various templates or guidelines can be created. FIG. 20 represents a guideline associated with FIG. 19. It is specifically for the factor "Develop and deliver a "branded" experience". Other factors would have their own individual guidelines. The guideline provides criteria to help the user select how to rate the alternatives on that factor.

To illustrate, FIG. 20 is a guideline for the factor "Develop and deliver a "branded" experience". If for that factor, the user felt the future was fairly much like the past (see center column in FIG. 20), they may enter a plus in the center column of the basic matrix. If the user felt there would be, e.g., boost in budgeting; key employees retained; emotional attachment with customer stressed; front line employees trained; segment market in terms of value; or competitors weak in these areas; then, for these factors, they may enter a plus on the fourth column of the basic matrix.

Figure 22:
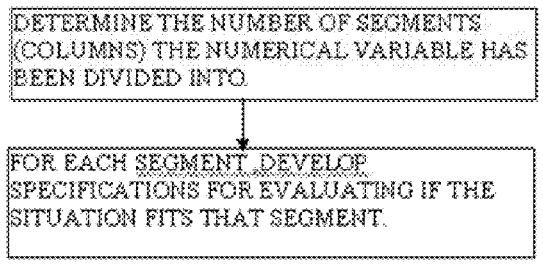
FIG. 22 illustrates an exemplary method to develop a guideline for a given criterion.

FIG. 22 illustrates an exemplary method to develop a guideline for a given criterion.

Guidelines or templates can be created for each factor and for most common situations.

In some embodiments, the invention provides systems to assist when several people are involved in a decision. In essence, each person may fill out a matrix separately. Then the system may collect each of the individual matrices and combine them into a composite. The composite can help identify areas of disagreement and assist in exploring and resolving the differences. The composite can also be used to compute averages and the other metrics the system and method provide.

More precisely, when several people are involved in the decision, the first step is for the participants to decide upon the alternatives and factors to be considered in the decision. This creates a common matrix for each person to employ. Second, each individual may complete his or her entries into the common matrix separately, meaning that each would individually enter his or her own plus or minus ratings. Third, using the web, a server or other system, each participant submits his or her matrix. Next, the system organizes the different matrices, and calculates the average entry and other metrics. Fifth, the system may organize the factors by level of disagreement and display the same, as indicated in FIG. 23.

In the example shown in FIG. 23, four matrices have been separately completed, one each by a VP of Marketing, a VP of Engineering, a Business Manager and a Project Team. The system has examined each of those four matrices and then presented them in FIG. 23 in a special format. A criterion or factor is listed and then immediately under it are given how each of the four parties rated the alternatives on that factor.

The special format also organizes the factors by the degree of disagreement. "Market share" has the most disagreement among the four participants, and is on the top (see yellow section to left). "Entertainment" has the next most disagreement, and so on down. The entries of each individual are given on the appropriate row.

The participants can then examine where the agreements are and where the disagreements are. They can then analyze the disagreements in more depth and more objectively.

Figure 24:
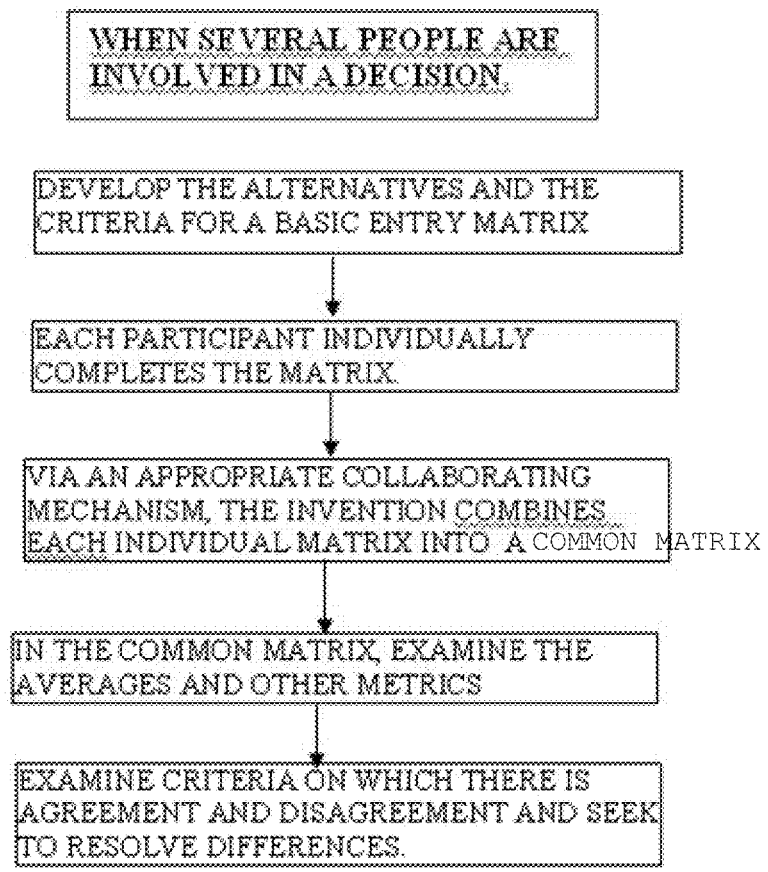
FIG. 24 illustrates a method corresponding to the examples such as shown in FIG. 23.

FIG. 24 illustrates an exemplary method employable when several people are involved in a decision.

In a variety of decisions, one must consider the viewpoint or possible actions of other relevant parties such as the customer, the competitor or perhaps the enemy. It is particularly difficult to forecast the actions of a party with goals and motivations that are quite different from one's own.

Referring to FIG. 25, embodiments of the invention can provide a system to facilitate insights into the thinking of such third parties by role playing. Throughout, the user imagines they are the other party and tries to input information as if they were that third party.

In the first window, the user inserts his or her best estimation of the other party's motivations and concerns in the situation. In this example, input are the likely motivations of a terrorist leader, and the user is role-playing that person.

Then, based upon those motivations and concerns, the user imagines the goal of that party and enters that in the second line. In the example that goal is to "Disrupt U.S. efforts in Iraq by hitting Iraqi training center or US convoy".

In the next slots, the user enters that person's i) alternatives for achieving the goal, and ii) the facts and factors they might employ to evaluate which alternative to select.

The concept is to first imagine the other party's motivations and goals. Then, role-playing that other party, to provide the alternatives and factors that the other party might utilize in a decision.

As noted in FIG. 25, the alternatives are given as well as the facts and factors, and then the critical inputs to the decision matrix are determined. By clicking on the "OK" button at the bottom right of FIG. 25, that information is automatically entered into a matrix, as in FIG. 26.

The user then enters the plus or minus ratings, and the best alternative then is determined, i.e., the alternative the other party might well select in the decision.

The purpose of this system is to help the individual evaluate a decision problem from the viewpoint of a different party or individual. That is done by role-playing and considering the motivation, concerns and goals of that other party. Then, the user sets up the decision matrix that person would face and completes it.

Since this is done in a structured manner from the user's best estimation of the other party's perspective, it often provides insight into the other party's actual thinking.

Figure 27:
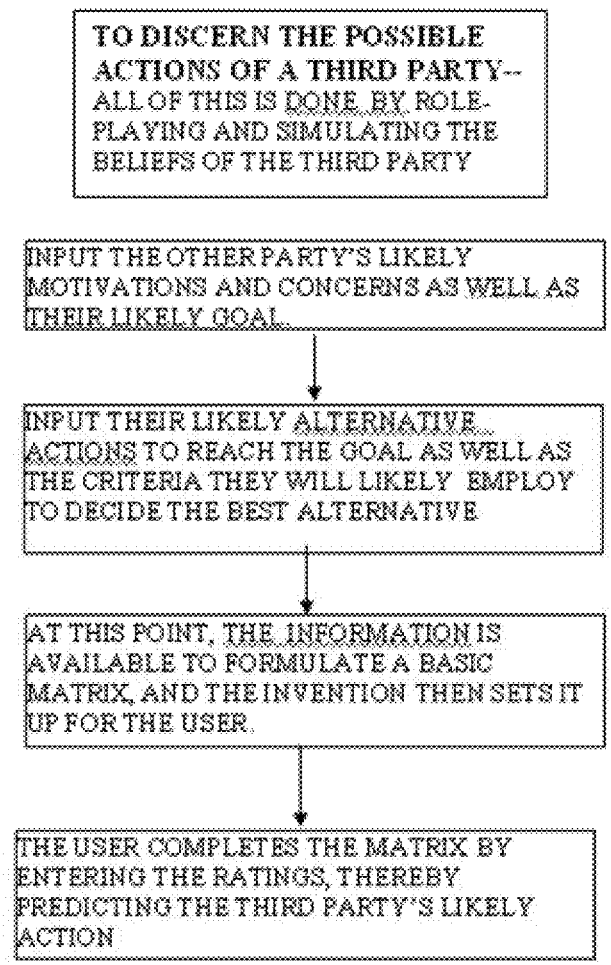
FIG. 27 illustrates a method corresponding to the examples such as shown in FIGS. 25 and 26.

FIG. 27 illustrates an exemplary method employable to anticipate the plan by an opponent.

In many decisions there is the need to generate new ideas and insights. One system of the invention estimates the probability something was missed, and new ideas might be needed to discern what was missed. Or perhaps a roadblock exists or impasse where there is a trade-off and one cannot improve on one factor without harming some other factor. Here, as well, some new ideas might assist.

Figure 28:
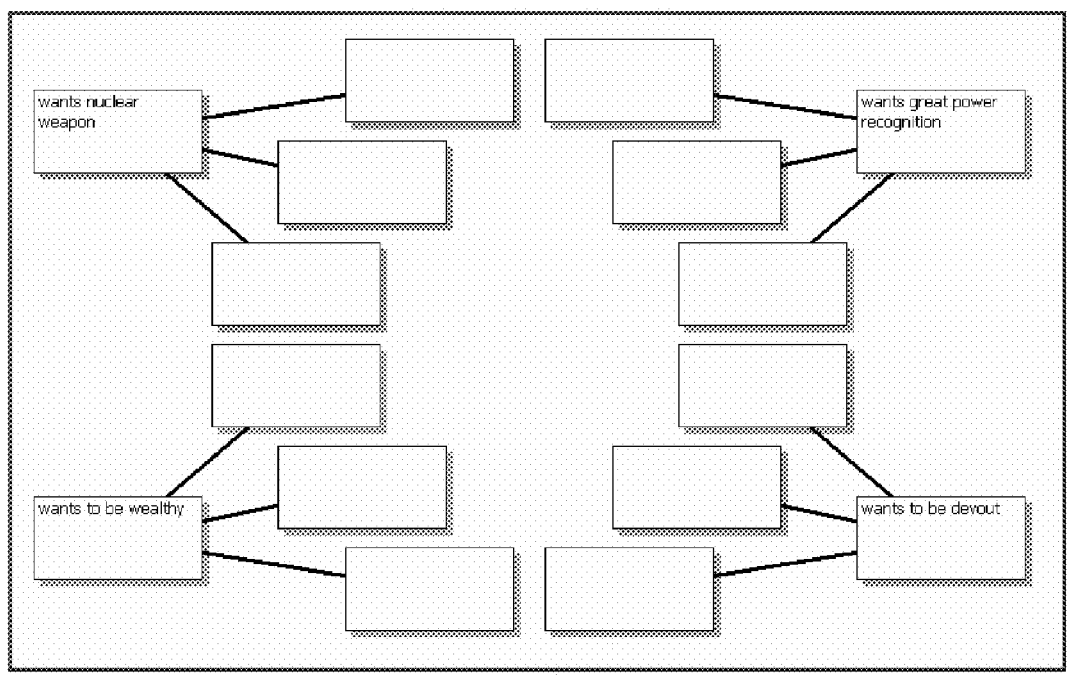
FIGS. 28 and 29 show initial and completed versions, respectively, of a synapse embodiment.

Referring to FIG. 28, certain embodiments of the invention employ a "Synapse" feature designed to help generate those ideas that is modeled on the synapses in the human mind. This method may be performed following creation of the basic matrix.

The Synapse feature starts as in FIG. 28. The four corners may be automatically populated by the system with the four most important factors, i.e., the factors that most discriminate. They are determined from the information inserted into the basic matrix, though these four factors can also be easily changed or written over.

As the four factors were selected for their importance to the decision, that helps ensure the user is focusing on the most critical issues and factors.

Next the user, or a group, randomly generates new ideas that are triggered by the factors in the four corners. Those ideas are typed into any of the interior boxes, filling them up. The ideas generated should be anything that pops into one's mind, since the need here is for novel, creative ideas, and one should not censor one's thoughts at this point. FIG. 30 shows a wide range of thoughts and ideas that may be inserted in this example.

Figure 29:
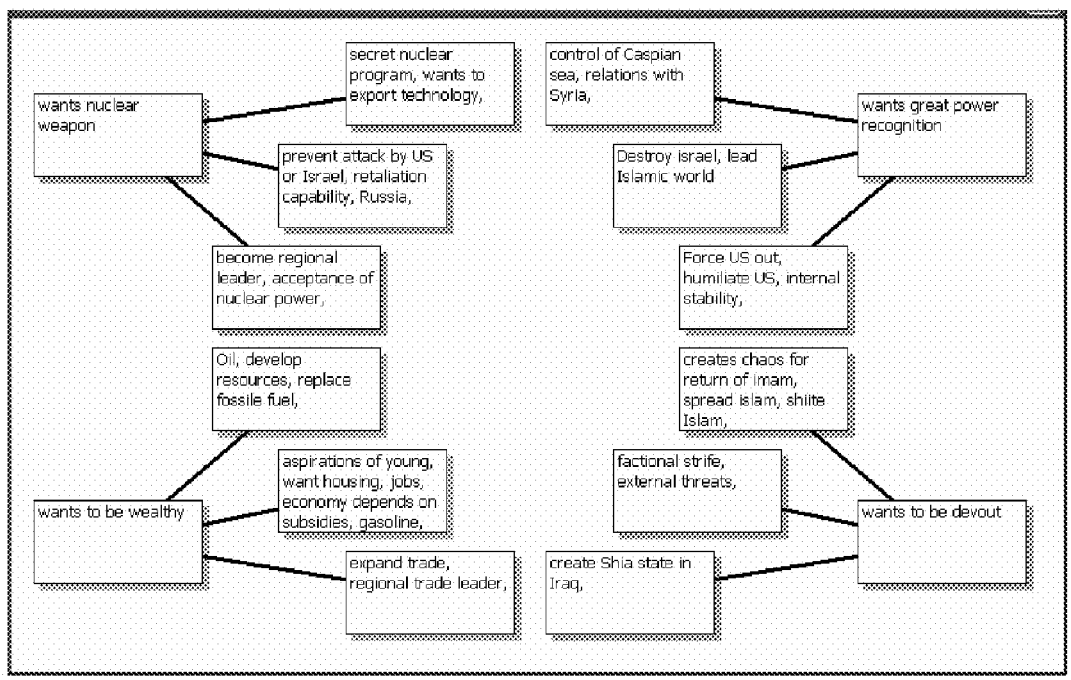

In this example, the important factor in the upper left corner is "wants nuclear weapons". The users then generated ideas based upon that factor and entered them into the boxes, as in FIG. 29.

Because the factors in the corners are pre-selected by the system to be highly important, the ideas generated tend to be focused on the critical issues. Often a new and perceptive insight is spawned. FIG. 30 illustrates an exemplary method employable with regard to this synapse feature.

Figure 31:
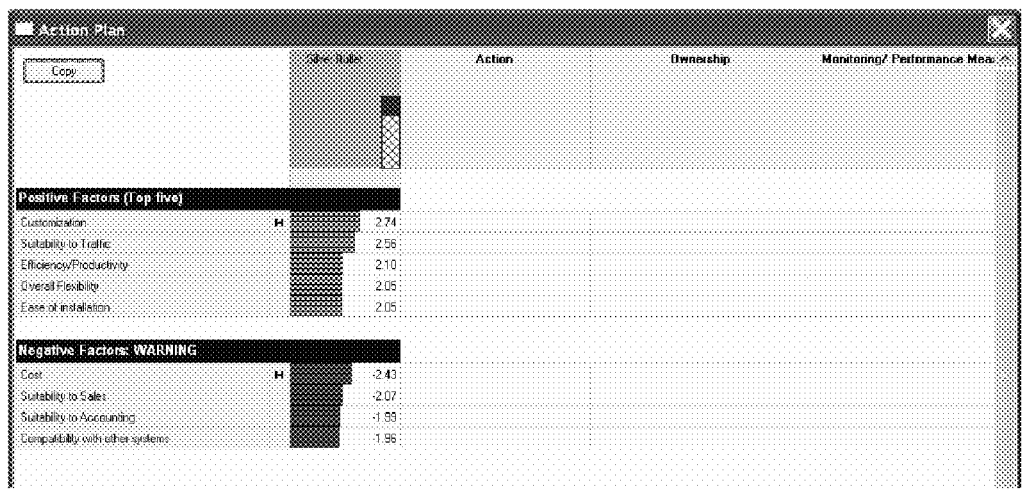
FIGS. 31 and 32 shows implementations of an embodiment including an action plan.

Generally even the best possible decision has risks. Whatever the decision determined, embodiments of the invention incorporate systems for depicting the possible risks, as shown in FIG. 31. The criteria listed under the Positive Factors heading are supportive of the decision. Their importance is depicted by the length of the green bars and the numbers are roughly proportional to the level of support. The criteria listed under the "Negative Factors" heading are contrary or against the decision. The red bars are proportional to how strongly they are against. Both sets of criteria can present risks and the system may highlight them in this manner.

The system determines this information directly from entries in the basic entry matrix. Ratings that are particularly positive or supportive of an alternative will be in the "Positive Factors" section. Ratings that are particularly negative will be listed under the "Negative Factors" section.

Figure 32:
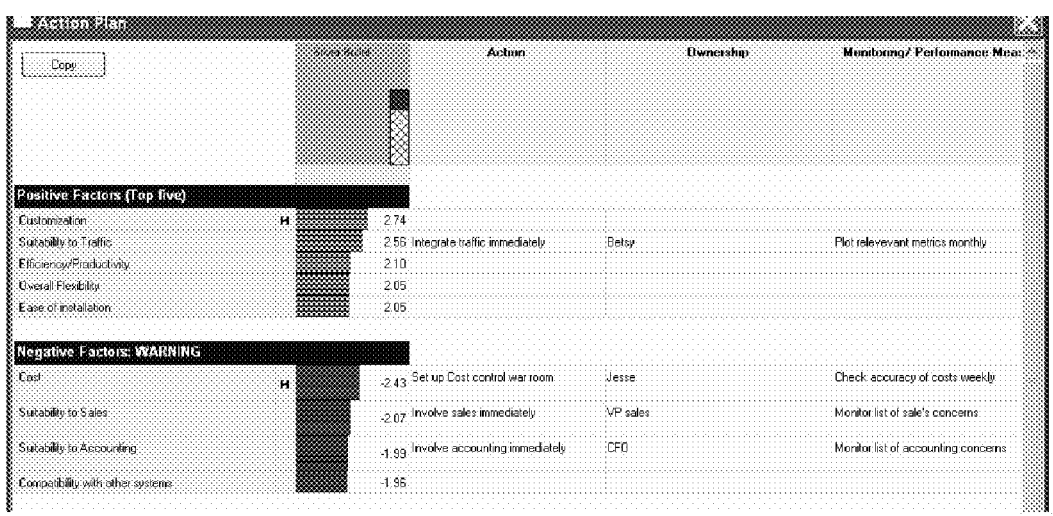

Once the system highlights the risks, the user should enter into the software the actions that will be implemented to mitigate or minimize the risks. That information is input across a row under the three columns, Action—or what action will be taken to mitigate the risk, Ownership—the person responsible for implementing the action, and Monitoring/ Performance Measure—how progress will be monitoring (see FIG. 32 as well in this regard). The Action, Ownership and Monitoring/Performance Measure would be completed for each risk for which mitigation action is desired.

Figure 33:
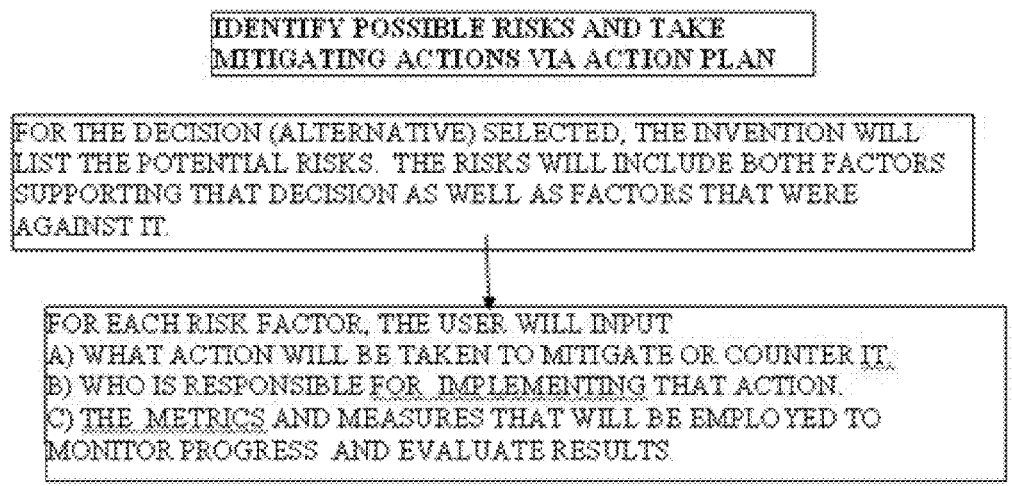
FIG. 33 illustrates a method corresponding to the examples such as shown in FIGS. 31 and 32.

FIG. 33 illustrates an exemplary method employable to incorporate action and performance measures.

It should be noted that, in alternative embodiments, the systems and methods of the invention may be provided as stand-alone programs, or as web- or server-enabled software which may be integrated with any database. In this way, collaborative features may be provided, such as Wiki or blog capabilities. In implementing this, a service-oriented or similar architecture may be employed, which would then permit a user to: hot-link to other programs and much more easily search for information and message traffic, saving time; and store and easily retrieve templates of standard situations, and also allow for users to create new templates. Past examples could then also be retrieved, saving the user's time and helping to ensure that important considerations are not missed.

In other alternative embodiments, e.g., for military or intelligence applications, a "future map" may be employed that presents various future options and possible enemy responses. The goal is to depict information not only about immediate options but also about the other side's possible responses and one's own counter-responses. Using a concise, visual format, this helps commanders see further into the future, to see at least a few steps beyond the other side's thinking Senior leadership are then better able to perceive not just the different available options but also their implications.

In financial embodiments, it is noted that improved financial projections and valuations may obtain by determining the input numbers from the underlying events and actions. In other words, it is best to develop the numbers directly from their foundations of customer behavior, competitor actions, product development, operational success and the other causal factors. Starting with the foundations opens up several new capabilities. First is improved accuracy, because basing the numbers on their underlying causes improves accuracy. Second is identification of risks, because when considering the foundation factors, some of these might be favorable and benefit the firm and some might not. The ones that are not favorable are often risks. As described, the systems and methods disclosed can expressly highlight these, thereby exposing risks that usually are hidden. Third is an identification of pathways to superior results. As some of the disclosed embodiments probe "underneath" the numbers, they often discover new means to improve the results, e.g., finding that taking certain actions could significantly enhance financial results. In many of the embodiments described, a benefit may be obtained by allowing users from non-economic backgrounds, e.g., marketing, operations, etc., to take part by providing input and participating in analyses on issues of their own expertise. This enhances accuracy and the involvement of these individuals boosts their commitment. Finally, it is noted that the disclosed methods may be employed before more traditional analyses, since starting with the foundations naturally improves results. One goal in certain embodiments may be to improve the quality of decisions by 20-40%.

The above description provided a system and method for estimating the probability of being surprised or blindsided in a situation. It might declare that 15% surprise exists. While that information is useful, it does not clarify if that 15% is good or bad or how successful the effort at reducing surprise has been. If the quantity of surprise started at 15%, then the analysis and effort may not have provided the desired value since the quantity of surprise has not been reduced. The system and method of the below embodiment estimates the quantity of surprise that has been reduced by the analysis or decision process. For example, the system might determine that the surprise has been reduced 25%, but that 75% of the estimated surprise remains. This might be a critical warning to users as it indicates that the effort and analysis put into the problem to that point has only cut the surprise 25%. Depending upon the situation, the users might then be encouraged to pursue further effort in identifying the possible surprises or issues thus far missed.

Figure 34:
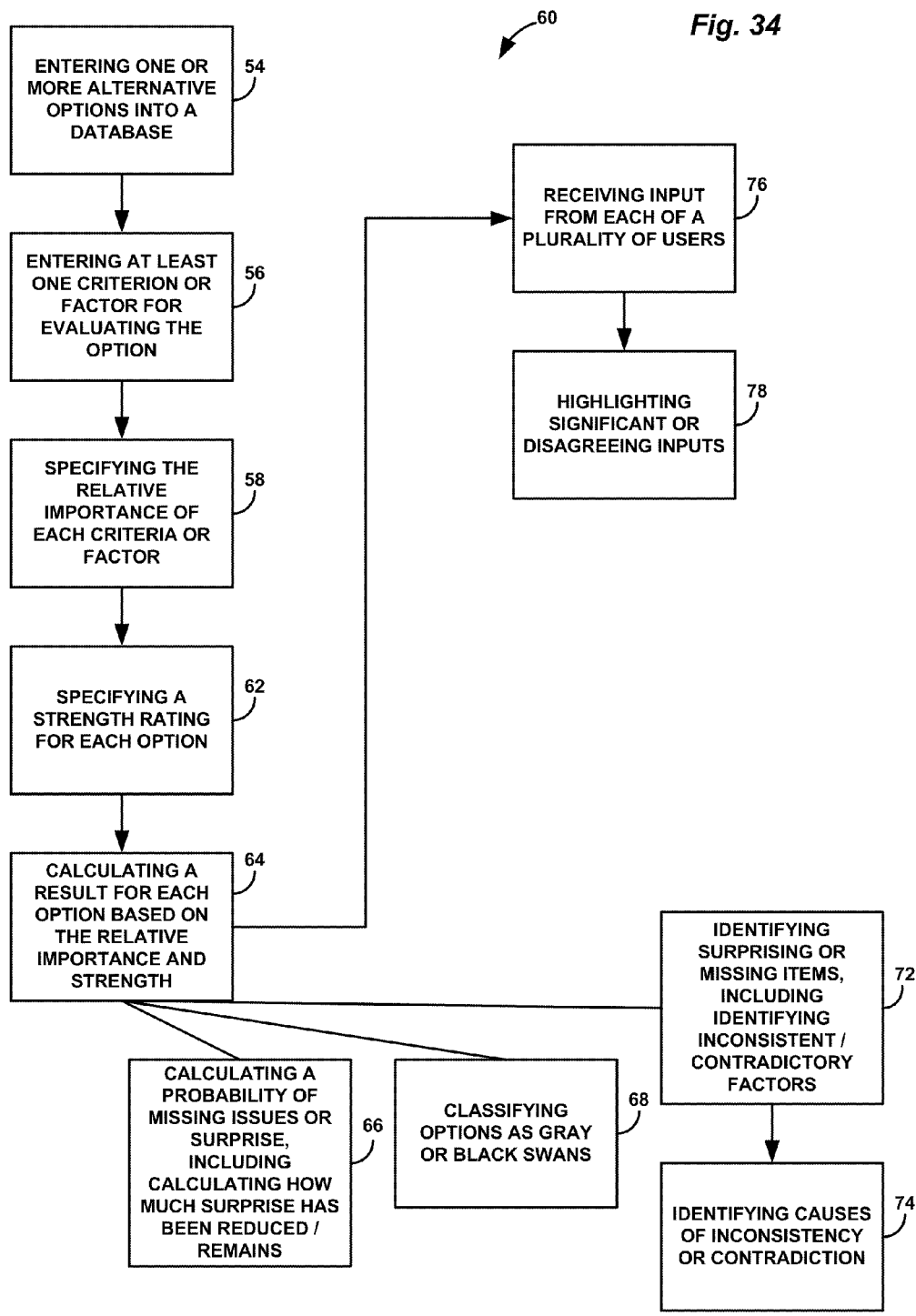
FIG. 34 illustrates a flowchart of a method according to another embodiment of the invention.

In one exemplary embodiment, as illustrated in FIG. 34, a method 60 begins with a step of entering one or more alternative options into a database (step 54). For each option, at least one criterion or factor for evaluating the option is entered (step 56). The relative importance of each criteria or factor is then specified (step 58). A strength rating for each option and criterion or factor is then specified (step 62). Finally, a result is calculated for each option based on the relative importance and on the strength rating (step 64). This calculation may include calculating a probability of missing issues or surprise, including calculating how much surprise has been reduced or how much surprise remains (step 66). This calculation may also include classifying certain options as grey swans or black swans (step 68). The calculating a result may further include identifying any surprising or missing items, including identifying inconsistent or contradictory factors (step 72). The identifying surprising or missing items may be followed subsequently with a step of identifying causes of inconsistency or contradiction (step 74).

In some systems, steps may be included of receiving an input from each of a plurality of users (step 76). This receiving input step may be followed by a step of highlighting any significant inputs, i.e., those deemed significant by the calculation, or by highlighting inputs that show areas of particular disagreement (step 78).

Figure 35:
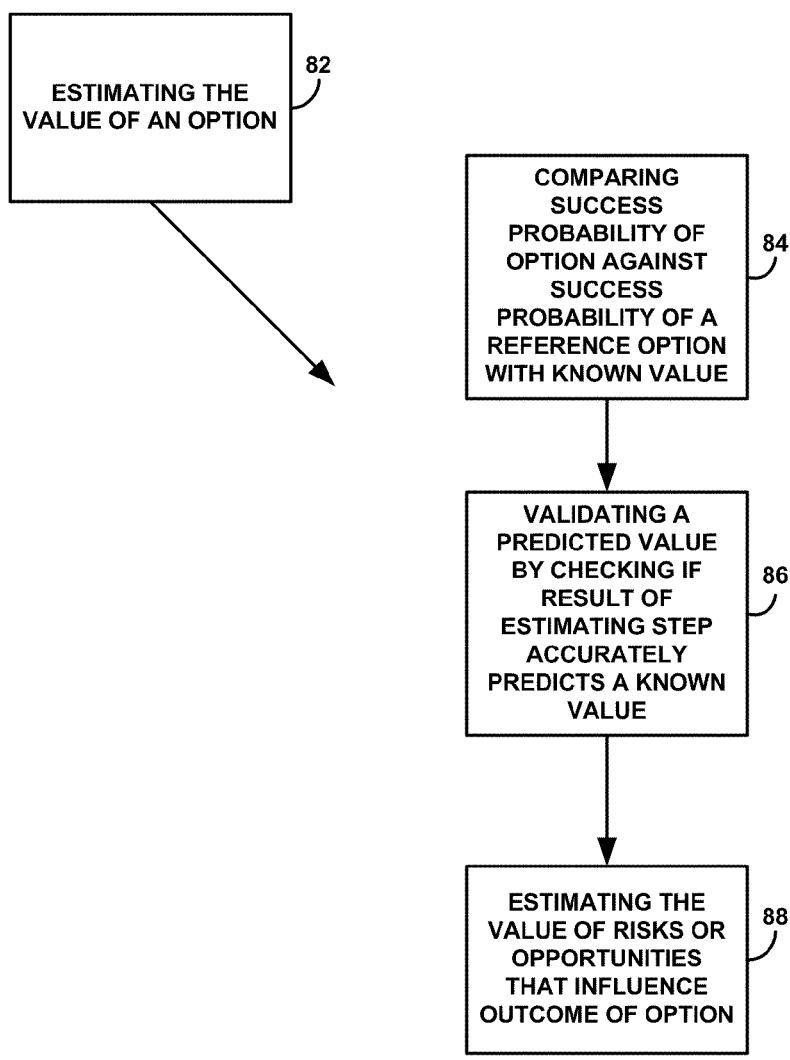
FIG. 35 illustrates a flowchart of a method according to yet another embodiment of the invention.

In yet another embodiment, as shown in FIG. 35, the value of an option may be estimated (step 82). A first step is to compare a success probability of an option against a success probability of a reference option having a known value (Step 84). This step is followed by a step of validating a predicted value by checking if a result of the estimating step accurately predicts a known value (step 86). Finally, a further step may be to estimate the value of risks or opportunities that influence the outcome of the option (step 88).

The previous embodiment may in some cases not consider the "black" or "gray" "swans". Black swans are events that are almost impossible to predict and occur almost "out of the blue". Some consider black swans as events that are essentially unpredictable. Gray swans are events that might occur unexpectedly, but at least there is some awareness that they might occur, although with such low probability that they are largely neglected or disregarded. Gray swans are discernable with some effort, but black swan events are very difficult to forecast.

This embodiment of a system and method estimates the probability of gray swans by first considering at what rate the analysis is presently reducing surprise. That is considered the half-life. The quantity of surprise reduction is also known, as described by the embodiment above. That information provides an estimate of the potential surprise reduction by continuing to analyze the situation as one has, and that provides the estimate of the probability of a gray swan. The probability of a black swan is the quantity of surprise remaining. It is the quantity of surprise left after a conscientious effort to reduce surprise, since black swan events are essentially unpredictably by conventional means. In other words, it is the quantity of surprise remaining that is not obtainable by continuing analysis. Discerning the black swans would require a completely different means of analysis, not merely a continuation of the existing effort.

Once the probabilities of black and gray swans are obtained, the embodied system and method attempts to identify what those events might be. It is here that the concepts of TRIZ developed by Genrich Altshuller are applied. TRIZ provides an algorithm to promote new insights and breakthroughs. In contrast, brainstorming is random. In brief, the TRIZ approach is to identify contradictions or inconsistencies. Next, one classifies the type of contradiction. Then, for this class or type of contradiction, one examines what procedures resolved them in the past. This then provides several means to potentially resolve the contradiction, and doing that typically provides the new insight or breakthrough. The result, typically, will identify issues previously missed, possible surprises, and should reduce the level of surprise.

Intuitively, a major indicator of surprise or issue missed is a contradiction or inconsistency. If there is a contradiction, a question may be raised as to what is causing that contradiction. In many cases it is an issue not previously seen, which is often surprising and might lead to a breakthrough. As an instance, a product may be advertised for a given purpose, but it may turn out that 25% of the customers are not employing the product for that purpose. This represents an inconsistency and a question may be raised as to why. There are many reasons for this discrepancy, and it might be determined that one of the features of the product is not being appreciated by the customer. This would be an unexpected or surprising finding. It might also lead to a breakthrough by revising the product or introducing a new product for this previously-missed need.

This embodiment of the system and method identifies the contradictions in the data, which then allows a discerning of the surprise, i.e., the issue missed. The contradictions themselves are identified by determining which factors are pointing to different outcomes. The factors are employed because they are supposed to predict the right answer, and hence, factors that point to different outcomes are contradictory. In effect, the contradiction is exposing some underlying consideration that was missed, i.e., the consideration causing the contradiction. Determining that underlying cause of the contradiction, thus, reduces the surprise or issues missed and often produces a breakthrough.

In a different type of analysis, the previous embodiment provides a means to estimate the financial value of a particular option or choice. The current embodiment of the method and system provides a different methodology that may be more accurate and which may provide more information. It proceeds by employing a comparison that might be the same option under different circumstances or a related option for comparison. Insight into the procedure can be obtained with the following example.

EXAMPLE 5

Suppose Horse1 (the reference) has a value of $1000 and has a probability 50% of winning its races. Horse2 has a probability of 10% of winning its race. It is clear that Horse2 has an expected value of $200. The difference in value is due to the difference in the probabilities of a success and is determined by the ratio of the probabilities times the value of the reference, Horse1.

The value, financial or other metric, may be determined similarly. Option1 (the reference) is assumed to have a known reference value. The challenge is to determine the value of Option2. An embodiment of the method and system will provide the probabilities of the success of Option1 and of Option2. That information will provide the estimated value of Option2, and, as in the horse racing example, is determined by the ratio of their probabilities of success times the value of Option1.

The method and system also provide a means to cross-check and validate the value that is estimated. In the example just provided, the value of Option2 was obtained by employing one reference value. Increased accuracy can usually be obtained by employing additional references, e.g., two, and cross-checking the prediction against a third, known value. That is, the two reference parameters are validated by checking if they accurately predict a third value that is known. Some calibration may be performed, if necessary. This cross-check procedure provides a means to validate the accuracy of the method and system for predicting value.

Given this information on the value of an option or choice, this embodiment of the method and system is then able to estimate the value of the underlying factors, including the value impact of the various risks and opportunities. The risks typically will be harming or decreasing the choice's value while the opportunities should increase it. The embodiment of the method and system accomplishes this because the value calculation is based upon the probabilities of success of the different options, as in the horse racing example. Those probabilities depend upon the underlying factors which themselves may include various risks and opportunities.

For instance, in one case a user may be estimating the expected value of next year's sales. The underlying factors used to predict next year's sales might include: expected growth in the economy, change in market share, strength of competition, ability to develop successful new products, effectiveness of the advertising and so on. Each of those factors may contribute to the quantity of next year's sales. Some of those factors are risks, such as the competition, and some might be opportunities, such as new products being introduced.

To determine the probability of success of that option, the various factors have different impacts, some greater than others. The user inputs the impact of a given factor. Once the value of the expected sales has been estimated, one can then determine the estimated impact on that value of any particular factor. This means the value impact of any factor on the expected sales can then be determined.

As an illustration, below are some exemplary steps in evaluating next year's sales. Given the various factors, the probability of success of different options is estimated based upon the influence of the factors on each option. A reference option is provided for which the sales are known, for instance, the sales for the current year. That information allows the estimate of the expected sales for next year. Now that the expected sales for next year is known, one can then determine the impact on that value of any particular factor. In this manner, the value impact of a risk or an opportunity (which themselves are different factors) can be estimated.

The system and method may be fully implemented in any number of computing devices. Typically, instructions are laid out on computer readable media, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file—storing medium. The outputs may be delivered to a user by way of a video graphics card or integrated graphics chipset coupled to a display that may be seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or wi-fi—connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the same group of alternative options of interest.

The above described previous embodiment permitted multiple users to simultaneously employ the methodology. The currently-described embodiment of the method and system extends that in a manner that provides more information and saves time. Entries are highlighted which are important to examine because both: a) the users disagree on the ratings; and also b) a particular factor is important in determining the outcome of that option.

Many factors have little impact, particularly on certain options or choices. Usually, one does not need to expend time on them. Likewise, even if a rating is important, everyone might agree. Although there might be benefit in double-checking such entries, it is usually more essential to carefully examine the entries in which there is disagreement. Thus, the current embodiment's method and system for multiple users spots the information that is important in determining the solution and also for which there is disagreement. In most cases, such entries should be examined carefully. Also, they are often a small percent of all the entries. Hence, the current embodiment's system and method saves time and also highlights the important entries that deserve careful review.

It should be noted that while the above description has been made with respect to specific embodiments, the scope of the invention is to be interpreted and limited only by the scope of the claims appended hereto. For example, while a Bayesian analysis has been described, any number of probabilistic methods may be employed to yield results, including: neural nets, data mining, simple probability algorithms, and various other such methods. It should also be noted that the above descriptions has used the terms "system" and "method" in an exemplary fashion, and these refer to system embodiments and method embodiments of the invention. The use of one such term does not exclude consideration of the other with respect to the described and pertaining embodiment. The term "software" is also used on occasion to mean either "system" or "method", depending on context.

The invention claimed is:

1. A method of decision-making and analysis for evaluating one or more alternative options or choices in order to determine value, risk, surprises or issues missed, and/or the most likely or best option, comprising:
    a. entering one or more alternative options into a database;
    b. for each of the alternative options, entering at least one criterion or factor for evaluating the option;
    c. specifying the relative importance of each of the criteria or factors;
    d. specifying, for each alternative option, a strength rating, wherein the specifying a strength rating indicates how well the criteria or factor either supports the option or opposes the option; and
    e. calculating a result for each alternative option based on the relative importance and strength rating.

2. The method of claim 1, wherein the calculating a result is associated with calculating a probability of missing issues or of being surprised, and wherein the calculating a result includes calculating an amount the probability of surprise has been reduced or an amount of surprise that remains.

3. The method of claim 2, wherein the calculating a result includes classifying the alternative option as being a gray swan type of event or a black swan type of event.

4. The method of claim 3, further comprising identifying one or more items that might be surprising or have been missed including identifying one or more factors or information that might be inconsistent or contradictory.

5. The method of claim 4, as used for, after identifying an inconsistency or contradiction, identifying one or more causes of the inconsistency or contradiction, whereby additional information may be gained regarding missed issues, and whereby a reduction of the probability of being surprised may be gained.

6. The method of claim 1, further comprising receiving an input from each of a plurality of users and highlighting one or more inputs that the step of calculating a result has indicated are significant to the conclusion as well as highlighting one or more inputs that the step of calculating a result has indicated are in disagreement.

7. A computer program, residing on a non-transitory computer-readable medium, comprising instructions for causing a computing device to perform the method of claim 1.

8. A method of decision making and analysis, comprising estimating the value of an option by comparing the success probability of that option against the success probability of a reference option with known value.

9. The method of claim 8, further comprising validating a predicted value by checking if a result of the estimating step accurately predicts a known value.

10. The method of claim 8, further comprising estimating the value of various risks or opportunities or other pertinent factors that influence the outcome of the option.

11. A computer program, residing on a non-transitory computer-readable medium, comprising instruction for causing a computing device to perform the method of claim 8.

* * * * *